United States Patent [19]

David

[11] Patent Number: 5,427,295
[45] Date of Patent: Jun. 27, 1995

[54] UNIVERSAL PLANETARY FEEDER HEAD FOR FEEDING WIRE

[75] Inventor: David A. David, Tel Aviv, Israel

[73] Assignee: Planetics Welding Systems Ltd., Rehovot, Israel

[21] Appl. No.: 43,128

[22] Filed: Apr. 5, 1993

[30] Foreign Application Priority Data

Aug. 25, 1992 [IL] Israel .......... 102935

[51] Int. Cl.⁶ .......... B65H 51/04; B65H 51/32; B65H 51/10
[52] U.S. Cl. .......... 226/180; 226/90; 226/181; 226/4; 414/432
[58] Field of Search .......... 414/432; 226/90, 180, 226/181, 4, 187, 184, 174, 188

[56] References Cited

U.S. PATENT DOCUMENTS

| | | | |
|---|---|---|---|
| 4,049,172 | 9/1977 | Samokovliski et al. | 226/90 |
| 4,085,880 | 4/1978 | Samokovliski et al. | 226/181 X |
| 4,150,772 | 4/1979 | Auer | 414/432 X |
| 4,177,912 | 12/1979 | Samokoliski et al. | 226/181 |
| 4,205,771 | 6/1980 | Samilovliski et al. | 226/90 |
| 4,261,499 | 4/1981 | Samokovliski et al. | 226/181 |
| 4,333,594 | 6/1982 | Cloos | 226/181 X |
| 4,398,445 | 7/1978 | Samokovliski et al. | 226/186 |
| 4,426,046 | 1/1984 | Heuckroth | 226/181 |
| 4,429,821 | 2/1984 | Jelezov et al. | 226/181 |
| 4,696,175 | 9/1987 | Skuplen | 226/188 |
| 4,934,576 | 6/1990 | Jelezov et al. | 226/181 |

Primary Examiner—Andrew M. Falik
Attorney, Agent, or Firm—Mark M. Friedman

[57] ABSTRACT

A universal planetary feeder for feeding a wire which includes an elongate hollow body defining a wire feed axis and adapted for high speed rotation about the axis, and a pair of planetary rollers associated with the body so as to be rotatable together with the body about the feed axis and which are mounted about the feed axis in mutually skewed respective orientations. The planetary rollers define circumferential peripheral feed surfaces spaced from each other about the feed axis and are configured for simultaneous engagements with a wire along preselected lines of contact. Each of the feed surfaces is intersected at right angles by a plane which is offset from the feed axis by an offset angle. Each of the roller is pivotable about an axis normal to the feed axis so as to adjust the offset angle between the roller and the feed axis, thereby selecting a roller feed surface profile parallel to the feed axis which corresponds to the external configuration of a wire selected from a range of wires having different diameter sizes. The arrangement provides a line of maximum contact between the roller surface and the selected wire. The pair of rollers are simultaneously urging radially towards the feed axis so as to apply a normal force to the wire along the lines of contact between the roller feed surfaces and the wire. When the body and rollers are rotated about the feed axis, the rollers are apply to the wire a generally tangential force along the lines of contact, thereby feeding the wire along the feed axis.

33 Claims, 22 Drawing Sheets

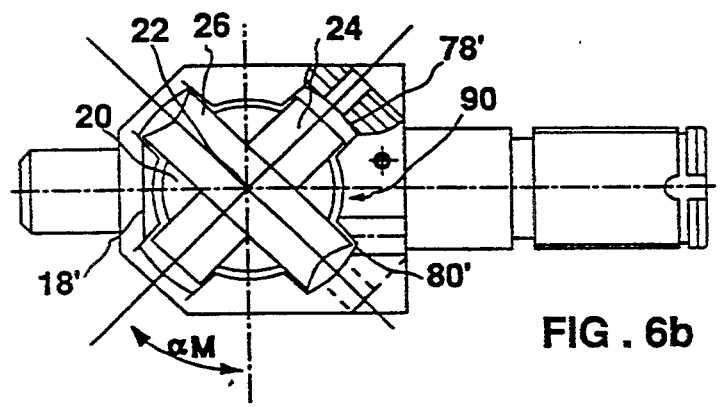
FIG. 6b
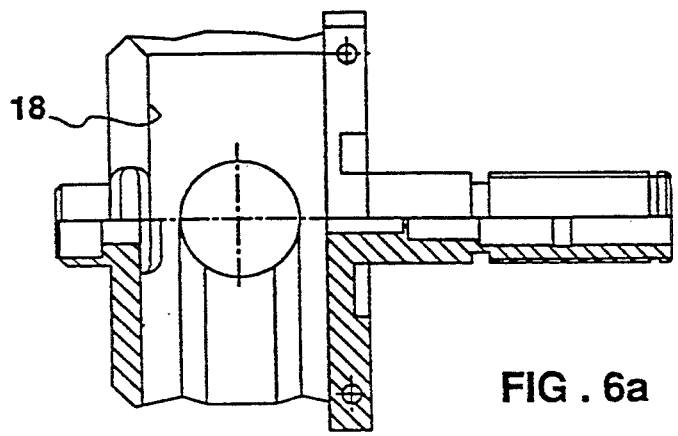
FIG. 6a
FIG. 5
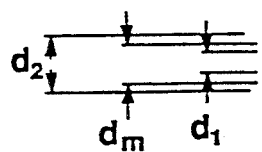
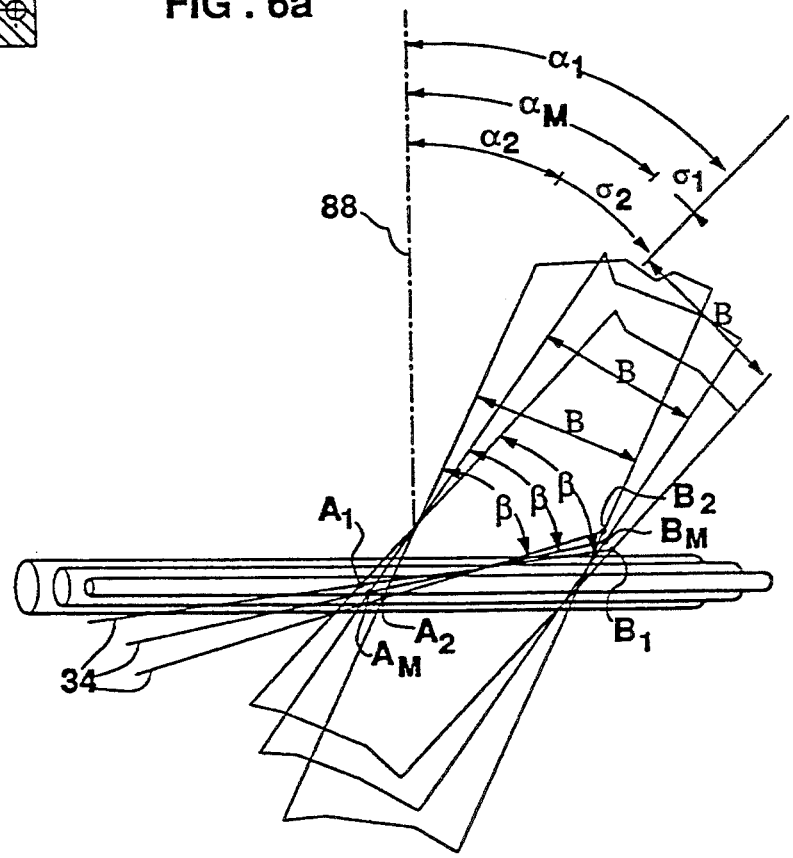

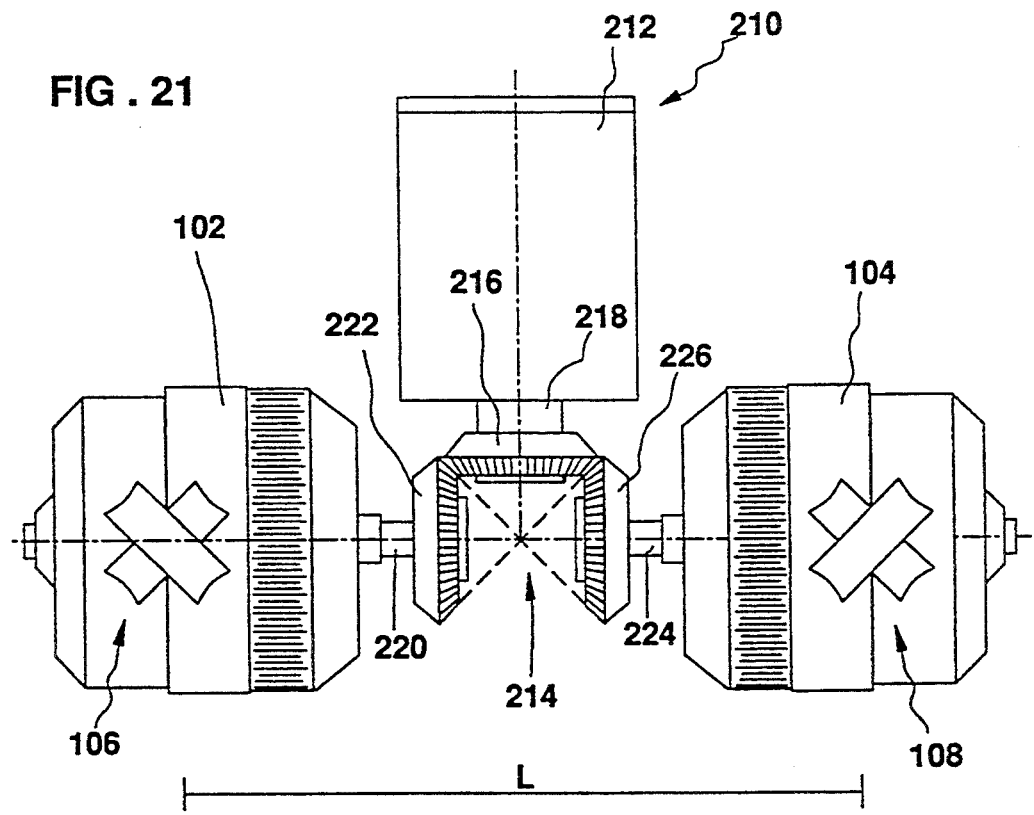

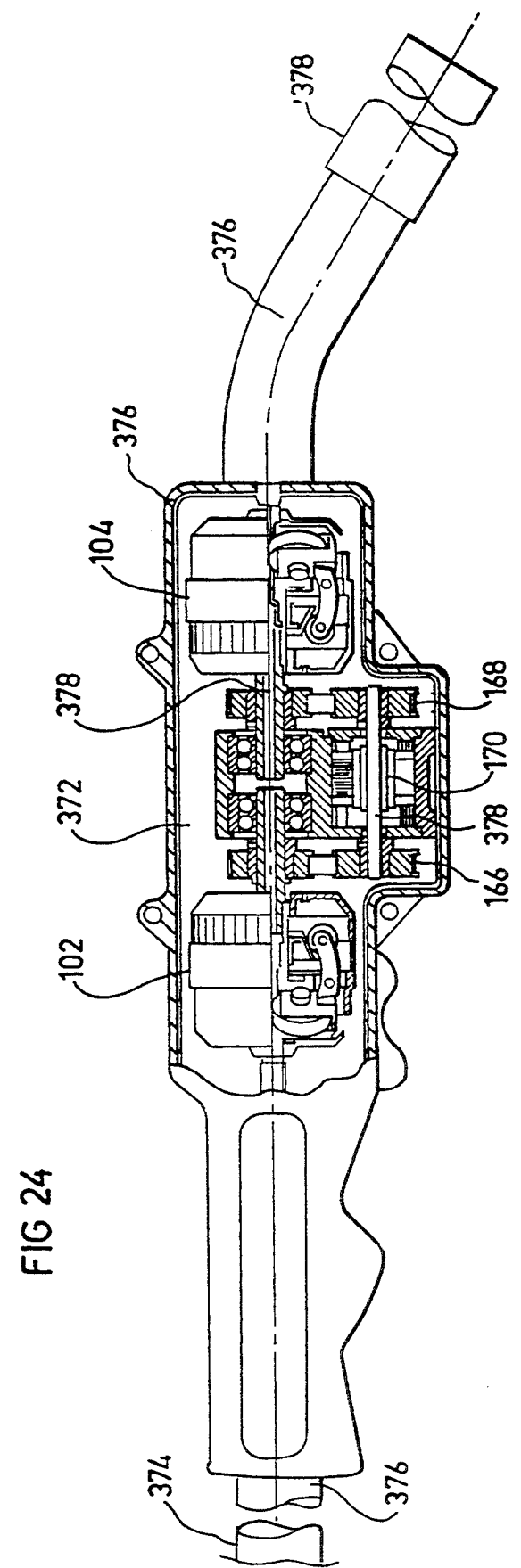

UNIVERSAL PLANETARY FEEDER HEAD FOR FEEDING WIRE

FIELD OF THE INVENTION

The present invention relates to planetary feeder head apparatus and methods for use with welding machines.

BACKGROUND OF THE INVENTION

Various methods of and devices for planetary feeding of a continuous electrode wire are described in U.S. Pat. Nos. 4,049,172; 4,085,880; 4,098,445; 4,205,771; 4,261,499; and 4,605,148.

A conventional planetary feeder comprises a body defining a longitudinal feed axis, and a pair of opposed, skewed rollers arranged symmetrically about the feed axis. Each of the rollers has a hyperboloidal surface profile. Each roller is mounted onto the body via a piston which is itself mounted for axial motion in a generally cylindrical seating formed in the body. Each roller is laterally mounted onto its associated piston externally of the seating and at a fixed angle relative to the feed axis.

The pistons are arranged parallel to each other and, by movement towards or away from the feed axis, the clearance between the rollers may be adjusted in accordance with the diameter of an electrode wire that it is sought to feed, and in accordance with a feed force that is sought to apply thereto. Adjustment of the clearance between the rollers is facilitated by adjustment of the rollers via a spring that is calibrated to apply a predetermined force to the each piston and roller via an associated lever and a pair of force transfer mechanisms arranged symmetrically about the feed axis.

When an electrode wire is located between the rollers so as to lie along the feed axis, rotation of the body causes the skewed rollers to feed the electrode wire along the axis. The feeding of the electrode wire between the rollers also causes it to be straightened.

Among disadvantages inherent in prior art planetary feeders are the following:

1. The lateral positioning of the rollers relative to the pistons results in a bracket-like transfer of forces from the levers to the rollers. This causes elastic deformation in the body of the planetary feeder thereby causing misalignment of the rollers and loss of purchase of the rollers on the electrode wire, so as to cause a reduction in the speed at which it can be fed.

2. Due to the relatively large number of different sizes and types of electrode wire that are used, frequent replacement of the springs is required.

3. Due to the fact that the respective angular positions of the rollers are fixed, true linear contact can occur between an electrode wire and the hyperboloidal feed surfaces of the rollers for a predetermined diameter of electrode wire only. Use of an electrode wire having a diameter different from the predetermined diameter reduces the area of contact between the rollers and the electrode wire, and therefore reduces the feed force that can be applied to the electrode wire by the rollers.

4. Furthermore, due to the rollers being mounted at fixed angles relative to the feed axis, typically of about 45°, it is also not possible to achieve acceptable welding speeds at a reduction coefficient of greater than 1.

5. Adjustment of the spring and, therefore, of the force applied to the rollers and, accordingly, of the straightening force applied to the electrode wire, is not possible.

The above-listed disadvantages inherently prevent conventional planetary feeders from convenient use with different sized wires at different welding speeds and at optimum speed.

There are known various types of continuous welding electrode feeders. One type of conventional feeder employs a plurality of rollers which rotate about respective mutually parallel axles perpendicular to the feed direction of the electrode.

There are a number of disadvantages in the roller-type of feeder, among which are the following:

In order to obtain maximum purchase on the electrode, opposing rollers are held together by forces of such magnitude that cause plastic deformation of the electrode as it is fed. This, in turn, causes rapid wear of the rollers and associated components, thereby requiring their frequent replacement.

The roller-type of feeder does not provide straightening of the electrode, and high frictional resistance occurs between the conduit and the fed electrode. The resulting nonlinear feeding of the electrode also causes a reduction in the speed at which welding can be performed.

Due to the relatively poor purchase between the rollers and the electrode, the plastic deformation of the electrode as it is fed, and the frictional resistance between the conduit and the electrode, systems employing conventional, parallel roller-based feeders have a low coefficient of efficiency. Accordingly, in order to feed electrodes at high speed, such as required in the TIME welding process, a system of very large, impractical proportions would be required.

A further type of conventional feeder employs a plurality of planetary units which rotate in the same direction about a feed axis.

Among disadvantages inherent in conventional planetary feeder heads are the following:

As each unit employs just a single pair of rollers, they can impart only a relatively low pushing force to the electrode.

As the electrode is fed, it is also twisted due to the planetary motion. The torsional force applied to the electrode is directly proportional to the feed force applied and the rotational velocity of the planetary unit. It will thus be appreciated that the speed at which an electrode can be fed is limited by the torsional strength of the electrode.

The maximum twisting force that can be applied to an electrode is governed, inter alia, by the frictional resistance of the conduit through which the electrode is fed. This is due to the fact that when a wire traveling through a feed conduit is twisted, resistance to the twisting action is encountered in the form of frictional resistance between the wire and the inside of the conduit. The frictional resistance to the twisting is proportional to the length of the wire inside the conduit.

Accordingly, the torsional force that may be applied to an electrode is inversely proportional to the length of the conduit. Consequently, the length of a conduit used therewith is limited to no more than about 3–4 m.

SUMMARY OF THE INVENTION

The present, invention seeks to provide an improved planetary feeder head for feeding and straightening of a continuous electrode wire, and an improved method of feeding and straightening a continuous electrode wire, which overcome disadvantages of known art.

The present invention further aims to provide a planetary feeder for and a method of planetary feeding of an electrode wherein the torsional force applied to the wire is minimized, thereby greatly increasing the length of the feed conduit that may be employed.

There is provided, therefore, in accordance with a preferred embodiment of the invention, a universal planetary feeder head for feeding a wire, which includes:

a generally elongate hollow body defining a wire feed axis and adapted for high speed rotation thereabout;

a pair of planetary rollers associated with the body so as to be rotatable together with the body about the feed axis and mounted about the feed axis in mutually skewed respective orientations, wherein the planetary rollers respectively define circumferential peripheral feed surfaces spaced from each other about the feed axis and configured for simultaneous engagement with a wire along preselected lines of contact therewith, and wherein each feed surface is intersected at right angles by a plane that is offset from the feed axis by an offset angle;

apparatus for pivoting each roller about an axis normal to the feed axis so as to adjust the offset angle between the roller and the feed axis, thereby to select a roller feed surface profile parallel to the feed axis which corresponds to the external configuration of a wire selected from a range of wires having different diameter sizes, thus providing a line of maximum contact between the roller feed surface and the selected wire; and apparatus for simultaneously urging the pair of rollers radially towards the feed axis so as to apply a normal force to the wire along the lines of contact between the roller feed surfaces and the wire, and wherein, when the body and rollers are rotated about the feed axis, the rollers are operative to apply to the wire a generally tangential force along the lines of contact, thereby to feed the wire along the feed axis.

There is also provided, in accordance with a further embodiment of the invention, a method of feeding a wire comprising the following steps:

employing a pair of planetary rollers spaced about and adapted to be rotatable about a wire feed axis;

orienting the rollers so as to provide a line of maximum contact between each roller and a wire of a selected diameter size;

simultaneously urging the pair of rollers radially towards the feed axis so as to apply a normal force to the wire along the lines of contact between the rollers and the wire; and rotating the rollers about the feed axis so as to apply to the wire a generally tangential force along the lines of contact, thereby to feed the wire along the feed axis.

In accordance with an additional embodiment of the invention, there is provided a planetary feeder head for feeding a wire and which includes:

a generally elongate hollow body defining a wire feed axis and adapted for high speed rotation thereabout;

a pair of generally hollow piston members mounted in the body along a radial axis perpendicular to the feed axis and having open ends adjacent thereto, and wherein each piston member has a side wall which extends in a generally radial direction and in which is formed one or more pairs of diametrically opposed openings, the piston members being rotatable together with the body about the feed axis;

a pair of planetary rollers each housed within a respective piston member and mounted via an axle extending at right angles to the radial axis and so as to protrude through one of the pairs of openings, wherein the rollers are mounted about the feed axis in mutually skewed respective orientations, and wherein the planetary rollers define respective circumferential peripheral feed surfaces which are spaced from each other about the feed axis and which are configured for simultaneous engagement with a wire along respective lines of contact therewith; and apparatus for simultaneously urging the piston members and, therefore, the rollers radially towards the feed axis so as to apply a normal force to the wire along the lines of contact between the roller feed surfaces and the wire, and wherein, when the body, pistons and rollers are rotated about the feed axis, the rollers are operative to apply to the wire a generally tangential force along the lines of contact, thereby to feed the wire along the feed axis.

In accordance with yet a further embodiment of the invention there is provided apparatus for feeding a wire along a feed axis which includes:

a base;

first and second planetary feeders mounted onto the base for rotation about a feed axis for feeding a wire therealong;

first rotation apparatus for rotating the first planetary feeder in a first predetermined rotational sense about the feed axis so as to cause feeding of the wire along the feed axis in a predetermined feed direction; and second rotation apparatus for rotating the second planetary feeder in a second predetermined rotational sense about the feed axis, opposite to the first predetermined rotational sense, so as to cause feeding of the wire along the feed axis in the predetermined feed direction.

Additionally in accordance with the present embodiment the first and second planetary feeders include:

a first pair of mutually skewed rollers disposed about the feed axis so as to engage the wire extending therealong and adapted, when stationary, to apply thereto a force normal to the axis, wherein the first pair of rollers is further adapted, upon rotation thereof by the first rotation apparatus, to apply to the wire a force which includes an axial force component applied generally along the feed axis, and a torsional force component applied about the feed axis in a first direction; and a second pair of mutually skewed rollers disposed about the feed axis so as to engage the wire extending therealong and adapted to apply thereto a force normal to the axis, wherein the second pair of rollers is further adapted, upon rotation thereof by the second rotation apparatus, to apply to the wire a force which includes an axial force component applied generally along the feed axis, and a torsional force component applied about the feed axis in a second direction opposite to the first direction.

Further in accordance with the present embodiment the first and second rotation apparatuses are adapted to rotate the respective first and second planetary feeders in opposite directions about the feed axis at similar respective speeds, such that the respective torsional force components applied to the wire in first and second directions by the respective first and second pairs of rollers are of approximately equal magnitude.

BRIEF DESCRIPTION OF THE DRAWINGS

The present invention will be more fully understood and appreciated from the following detailed description taken in conjunction with the drawings, in which:

FIG. 5 is a diagrammatic illustration of various selectable orientations of the line of contact between the hyperboloidal feed surface of a roller of the feeder of the present invention and electrode wires of various selected sizes;

FIGS. 6A and 6B are respective side and top views of an integrally formed body of the feeder head of FIGS. 1A and 1B, constructed in accordance with an alternative embodiment of the present invention;

FIG. 21 is a schematic side-view of a double action feeder employing a toothed differential transmission in accordance with an alternative embodiment of the present invention;

FIG. 22 is a schematic-side view illustration of a feeder construction similar to that of FIG. 21, but having a differential transmission that employs an idler gear;

FIG. 24 is a side-view illustration of a goose-neck type welding gun employing a modified version of the double-action feeder illustrated in FIG. 11.

DETAILED DESCRIPTION OF THE INVENTION

Figure 1A:
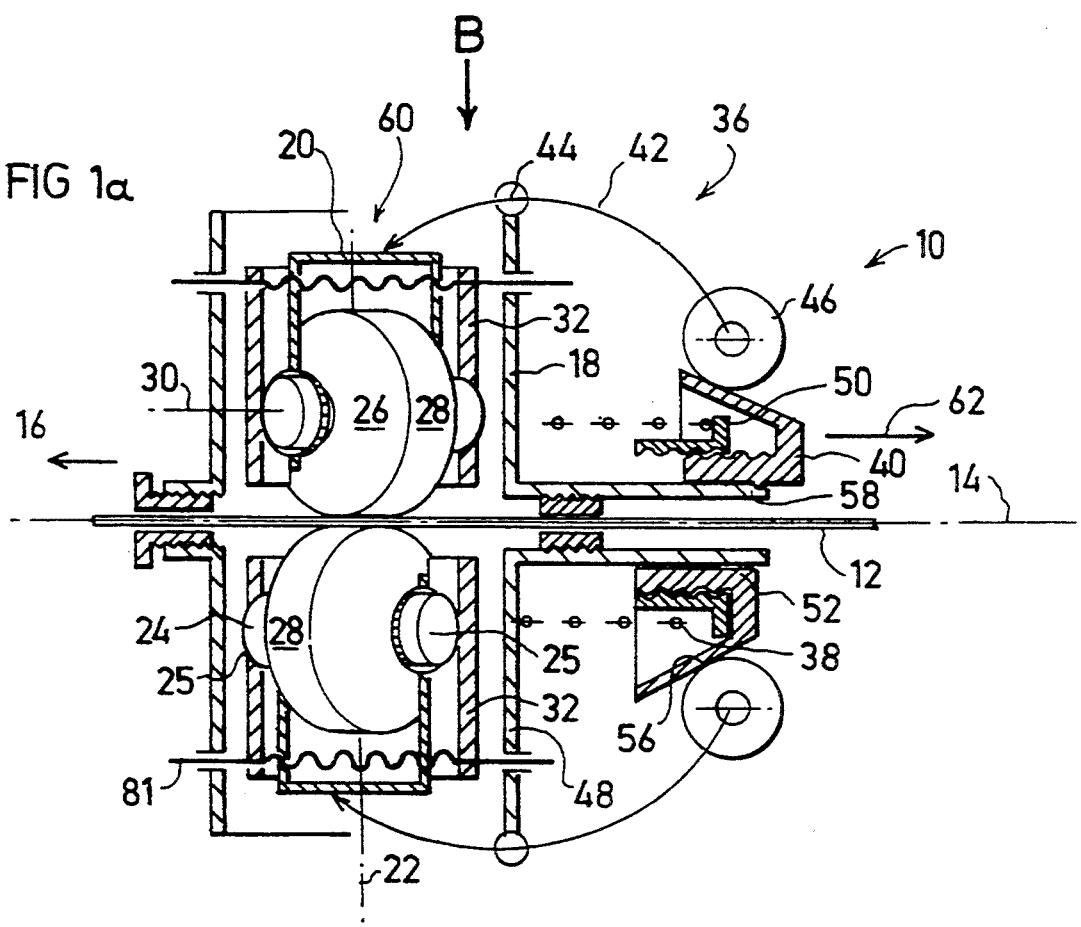
FIG. 1A is a schematic side-sectional view of a universal planetary feeder head constructed in accordance with the present invention which is split to show two operative orientations.

Reference is now made to FIGS. 1A–3, in which is illustrated a universal planetary feeder head, referenced generally 10, constructed and operative in accordance with a preferred embodiment of the present invention. Feeder head 10 is operative to feed an electrode wire 12 along a feed axis 14 in a feed direction indicated by an arrow referenced 16.

Feeder head 10 has a body 18 in which are mounted pistons 20. Pistons 20 are mounted co-axially, along an axis 22, and symmetrically about feed axis 14. Each piston 20 is hollow and seats therein an axle 24 on which is mounted a feed roller 26. Each feed roller defines a circumferential feed surface 28 which has a hyperboloidal profile. Each axle 24 is aligned such that its longitudinal axis 30 is parallel to feed axis 14. Pistons 20 are seated, according to the present embodiment of the invention, in cylindrical case carriers 32, which are described in detail hereinbelow.

Axes 30 of axles 24 lie in parallel planes and are oriented so as to define an adjustable offset angle therebetween in the range typically 70°–110°. Axles 24 are preferably disposed symmetrically about feed axis 14. Rollers 26 are oriented transversely to the feed axis 14, parallel to respective axles 24, such that the respective feed surfaces 28 of the feed rollers 26 are skewed with respect to each other in such a manner so as to engage wire 12 positioned therebetween along respective lines of contact 34 (FIG. 5).

The rollers 26 are operative to engage wire 12 and to respectively apply thereto, along contact lines 34 (FIG. 5), a preselected radial force along piston axes 22. Application of this force causes both feeding and straightening of an electrode wire by the feed rollers 26 when body 18 is rotated as described hereinbelow.

Figure 3:
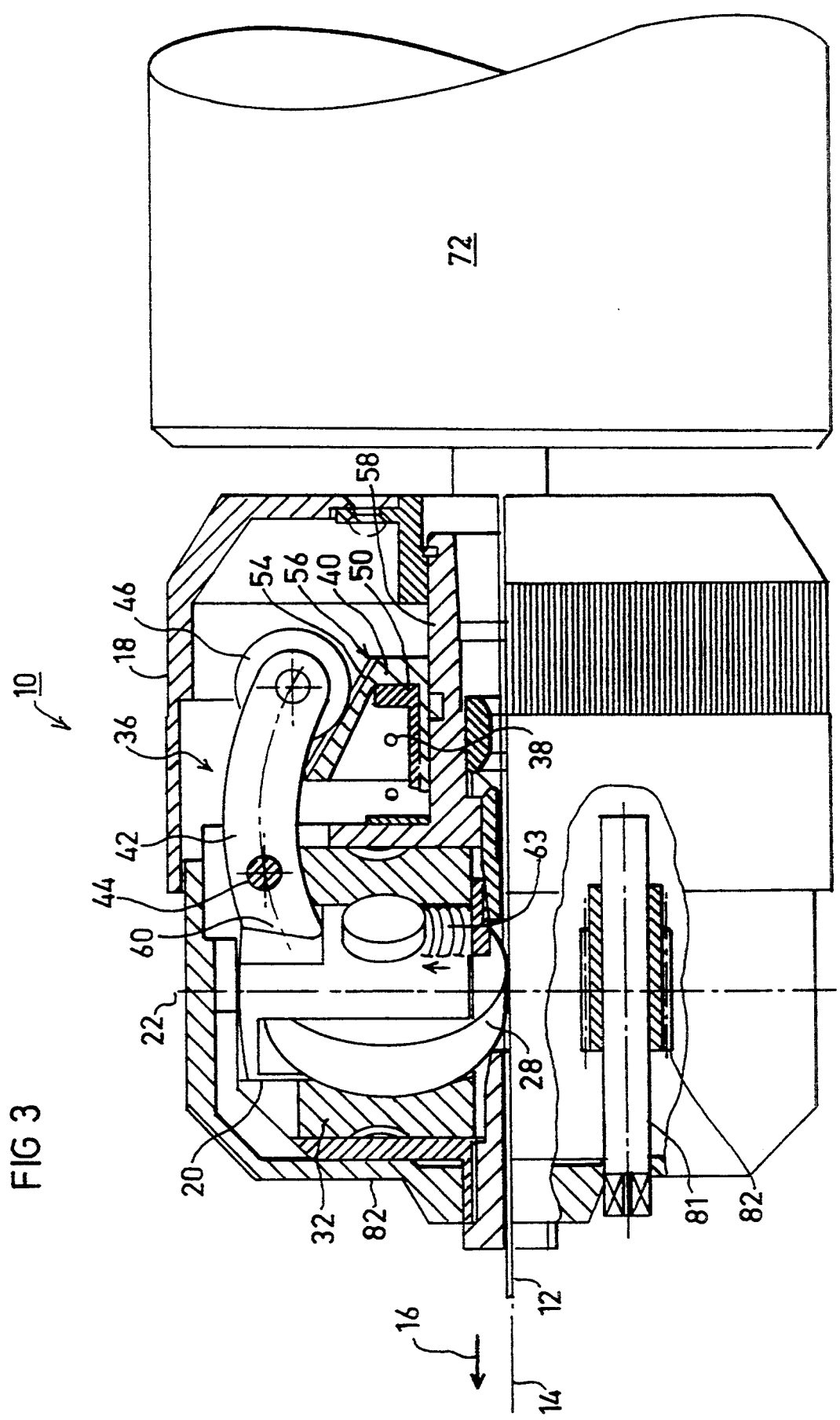
FIG. 3 is a partially cut-away side view of the feeder head illustrated in FIGS. 2A and 2B.

The force applied to pistons 20 is regulated via a pair of symmetrically positioned force transfer mechanisms 36 (FIGS. 1A and 3). Each force transfer mechanism 36 includes an elastic compression member 38, a conical force transmission cone 40, a lever 42, hingedly attached at a location 44 to a portion of body 18, and a roller element 46.

compression member 38 is preferably a compression spring that is retained under a known compressive force between a radial flange portion 48 of body 18 and a force control member 50 threadably mounted onto an outward facing surface of a flange 52 of force transmission cone 40. Roller element 46 is adapted for rolling along a groove 54 (FIG. 3) formed on a conical outer surface 56 of force transmission cone 40.

Compression member 38 applies a known axial force to force transmission cone 40, thereby urging it rearwardly along a generally cylindrical, rearwardly extending portion 58 of body 18. The roller element 46 attached to each lever 42 is urged rearwardly and outwardly by force transmission cone 40 so as to cause application of an inwardly directed force to the associated piston 20 via an end portion 60 of lever 42. The axial component of force applied to each piston 20 is transmitted, via its associated roller 26, to the wire 12 located between the rollers.

It will thus be appreciated that the force applied to an electrode wire is directly proportional to the force applied by the compression member 38, and that adjustment of the compression member causes a known adjustment in the force applied to the wire.

Adjustment of the force applied by compression member 38 is provided by control member 50. Preferably member 50 is a nut which, as stated above, is threadably mounted onto an outwardly-facing surface of flange 52 of the force transmission cone. Rotation of the control member 50 causes translation thereof along the feed axis 14, relative to the force transmission cone 40.

Reference is now made particularly to FIG. 1A, wherein control member 50 and force transmission cone 40 are shown in first and second operative orientations. In an upper portion of the drawing, (above feed axis 14) force transmission cone 40 is shown threadably mounted onto control member 50 at a first relative orientation, while in the lower portion of the drawing, (below feed axis 14) force transmission cone 40 is shown threadably mounted onto control member 50 at a second relative orientation.

The first relative orientation is seen to position roller 46 outwardly to an extent which is greater than the outward extent of the position of roller 46 when the cone 40 is in its second relative orientation. The greater the extent of outward disposition of roller element 46, the greater is the inwardly directed force exerted on piston 20 and on corresponding roller 26.

As shown in FIG. 3, axles 24 are provided with return compression members 63 which are operative to aid the outward return of rollers 26 in response to a decrease in the force applied thereto by force regulation mechanisms 36.

Figure 4A:
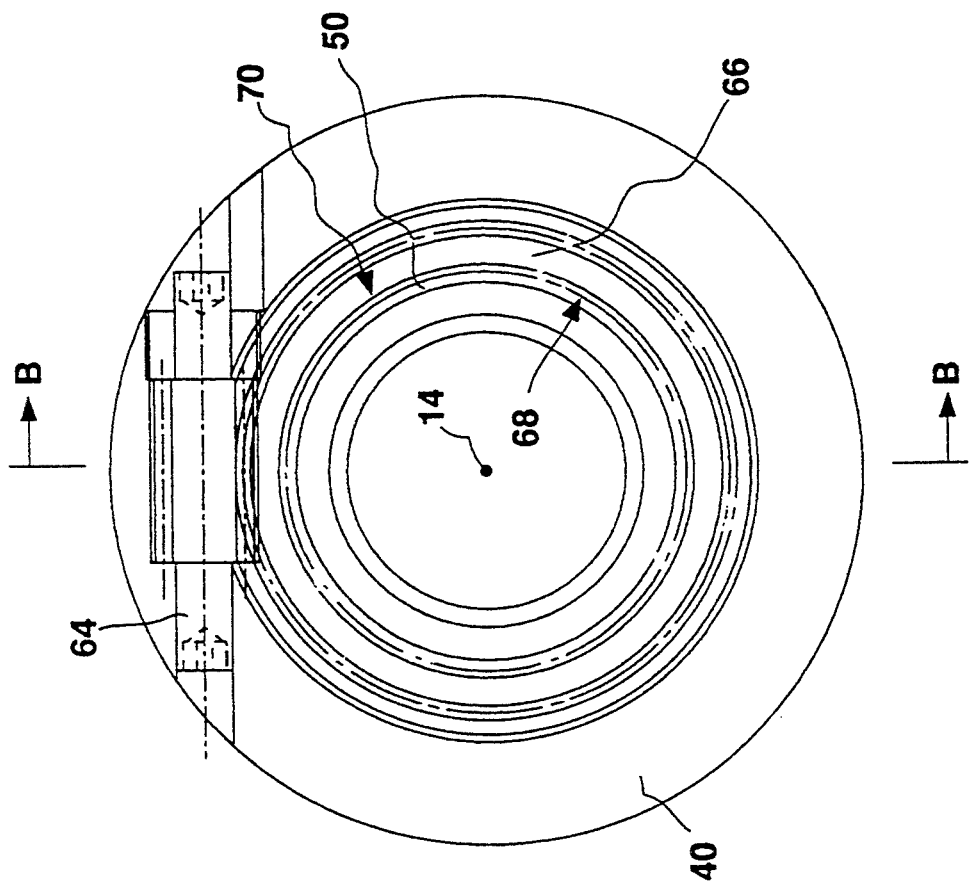
FIGS. 4A and 4B are respective front and side-sectional views of an adjustable force transmission cone constructed in accordance with the present invention.
Figure 4B:
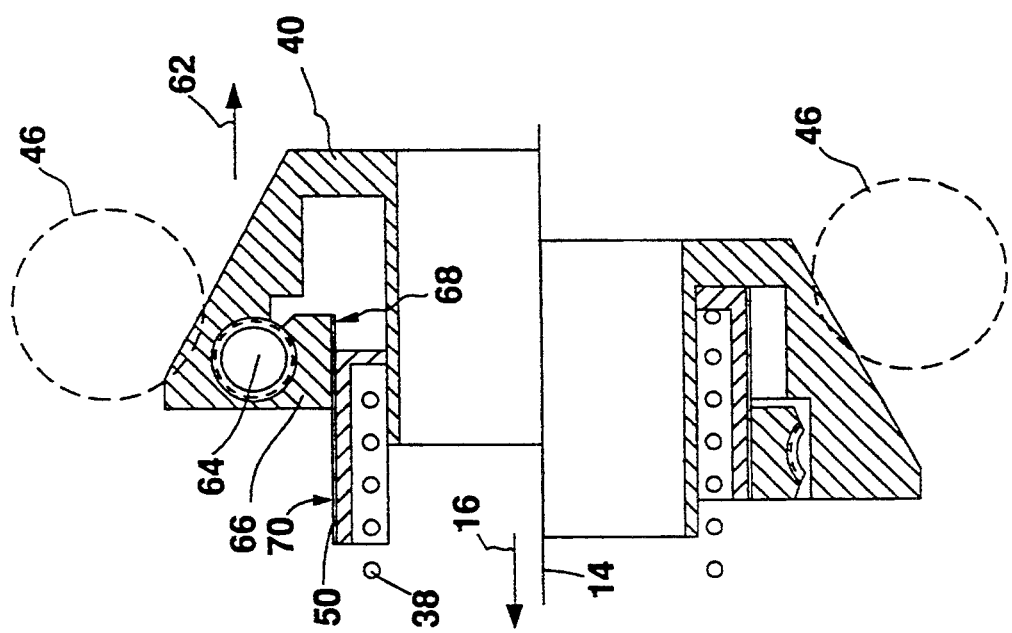

Referring now briefly to FIGS. 4A and 4B, there is shown a conical force transmission cone 40', which is similar to force transmission cone 40 illustrated in FIGS. 1A–3, except that adjustment of the position of the force transmission cone 40' relative to compression member 38 is provided via a worm 64 and a worm wheel 66. The worm wheel 66 has, on an inward-facing surface thereof, referenced 68, a screw thread which drives a control member 50' via an external screw thread thereof, referenced 70.

The view of FIG. 4B is split similarly to FIG. 1A. Accordingly, the force transmission cone 40' shown above feed axis 14 is displaced in the direction of arrow 62 relative to the position of the force transmission cone 40' as shown below feed axis 14.

Figure 1B:
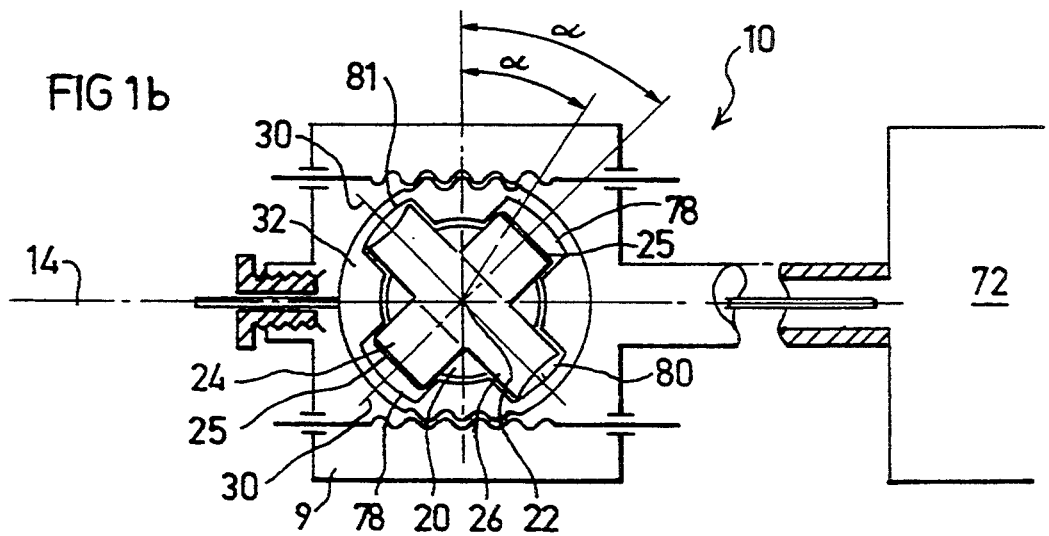
FIG. 1B is a schematic top view of the head of FIG. 1 taken in the direction of arrow B therein.

Referring now particularly to FIGS. 1B and 3, a motor 72 is connected to body 18 of feeder head 10. Feeding of the wire 12 occurs in response to activation of motor 72 which is operative to rotate body 18, and thus also case carriers 32, pistons 20 and rollers 26. As the body 18 is rotated, the rollers 26, which are in positive engagement with wire 12 along respective lines of contact 34 (FIG. 5), are operative to apply a skewed tangential pushing force to wire 12 in the feed direction 16, thereby to feed the wire 12 along the feed axis and into the path of a welding head (not shown).

Referring now to FIGS. 1A–3, according to the present embodiment, the pistons 20 are mounted in body 18 via generally cylindrical case carriers 32. Each case-carrier 32 has formed on an inward-facing surface thereof two pairs of diametrically opposed longitudinal grooves 78 and 80. A first pair of grooves 78 is adapted to seat the ends 25 of axles 24. A second pair of grooves 80 is adapted to receive the edge surface of rollers 26.

The case carriers 32 are positioned such that the respective rollers 26 seated therein are mutually offset by an angle corresponding to the offset angle between the roller axles 24, namely, in the typical range 70°–110°.

The mounting of rollers 26 internally of pistons 20 and in coaxial registration therewith, rather than externally thereof and laterally thereto as with prior-art devices, ensures that translation of rollers 26 is permitted only in a radial direction. This is an important feature of the present invention, as it ensures that no bending of the rollers will occur during feeding, and, accordingly, substantially no misalignment will occur.

It follows, therefore, that the pistons and rollers of the feeder head of the present invention are able to provide maximum purchase along a selected profile of roller surfaces 28 which define lines of maximum contact with an electrode wire, thereby increasing the speed at which the electrode wire can be fed, and also straightening the electrode wire more efficiently than is possible with prior art devices.

Furthermore, so as to enable adjustment of the feeder head 10 to wires of different respective diameters, the offset angle between the rollers may be adjusted by rotational adjustment of the case carriers 32. This rotation is provided about axes 22 and enables the contact lines 34 between the rollers 26 and the wire 12 to be maintained, regardless of the diameter of the wire.

Figure 2A:
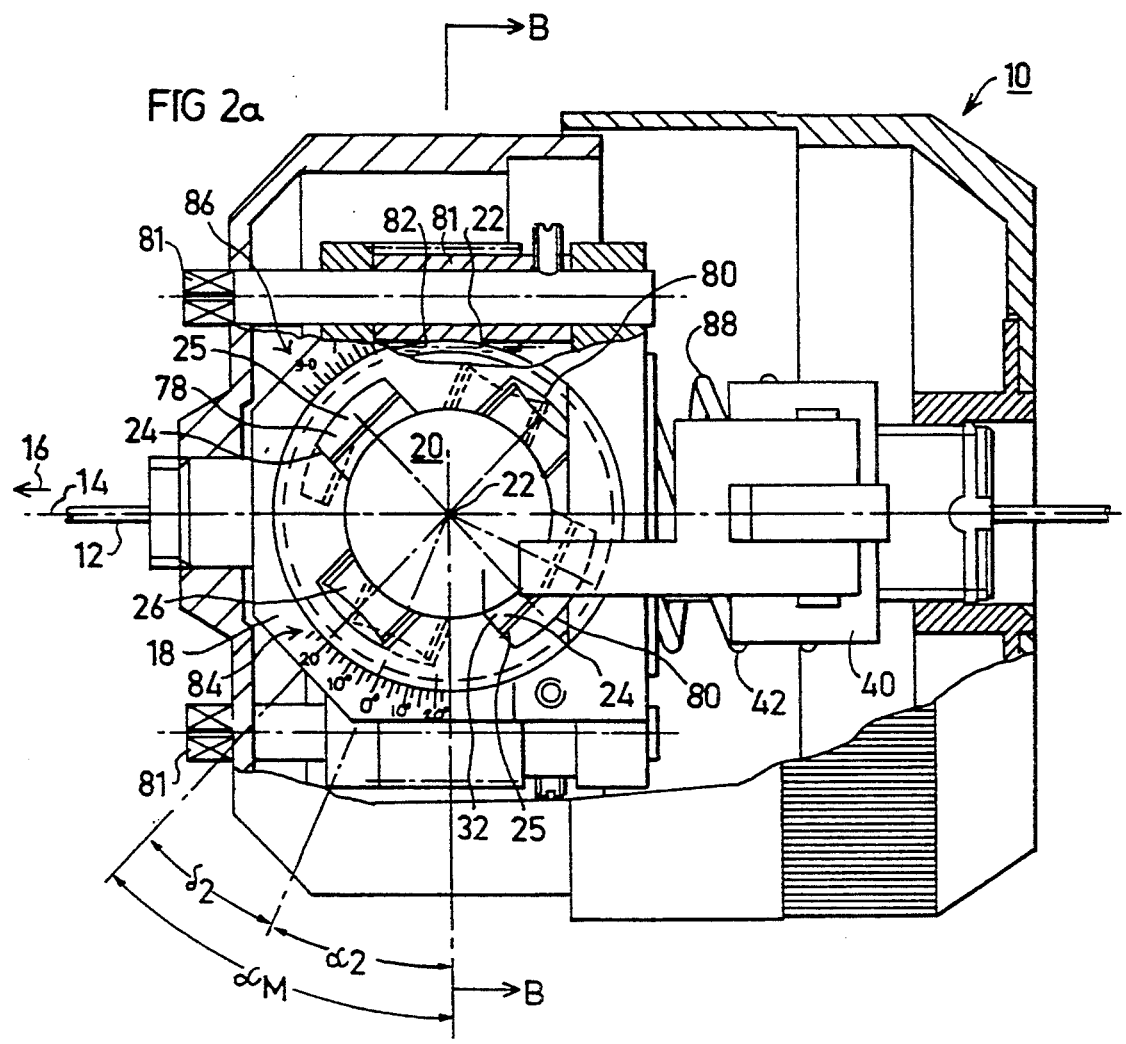
FIG. 2A is a partially cut-away top view of a universal planetary feeder head constructed in accordance with the invention.
Figure 2B:
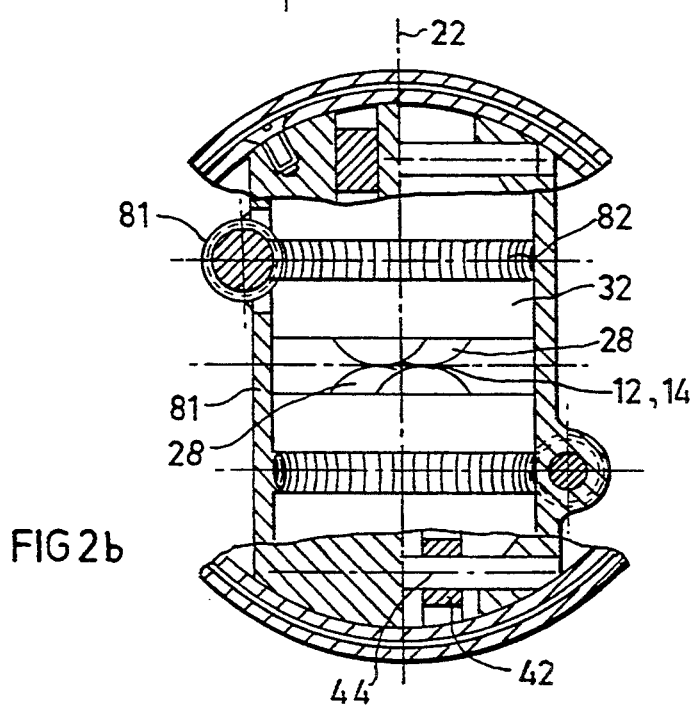
FIG. 2B is a sectional view of the planetary feeder head of FIG. 2A, taken along line B—B therein, and showing apparatus for adjusting the respective angular orientations of the rollers.

Referring now particularly to FIGS. 2A and 2B, it is seen that each case carrier 32 has a threaded crown 82 formed on its exterior and may be rotated in a selected direction about axis 22 by rotation of a worm 81 in driving contact with crown 82. As shown in FIG. 2A, respective vernier scales 84 and 86 are provided, so as to show both the angle through which the case carriers and hence the rollers 26 have been rotated and the size of a wire suitable for feeding.

As shown in FIG. 5, the line of contact 34 between each roller 26 and the wire 12 is adjustable in accordance with the wire diameter. The angular orientation of the roller surface relative to an imaginary line 88 perpendicular to the feed axis 14 is known as the "angle of feed slide". In FIG. 5, the illustrated roller is shown as having an angle of feed slide $\alpha_m$, and the line of contact is represented by line $A_mB_m$, along which the profile of the contact surface of the roller corresponds to the external profile of an electrode wire having diameter $d_m$. $d_m$ is taken to represent the diameter of an electrode wire of median size of a selected size range of electrode wires. Accordingly, angle $\alpha_m$ represents the angle of feed slide to which the rollers should be set in order to properly accommodate an electrode wire of diameter $d_m$.

For an electrode wire having a diameter $d_1$ roller 26 is pivoted about axis 22 so as to provide a contact line $A_1B_1$, while for an electrode wire having a diameter $d_2$ roller 26 is pivoted about axis 22 so as to provide a contact line $A_2B_2$.

Thus, when it is sought to feed an electrode wire of diameter $d_1$ or $d_2$, case carriers 32 and thus rollers 26 are rotated about axis 22 so as to change the preselected angle of feed slide $\alpha_m$ either to $\alpha_1$ or $\alpha_2$, thereby also changing the line of contact accordingly, from $A_mB_m$ to either $A_1B_1$ or $A_2B_2$, such that the contact line matches the external configuration of the electrode wire.

In order to adjust the line of contact to a desired line of contact, roller 26 has to be pivoted through an adjustment angle $\delta$. Accordingly, if initially $\alpha = \alpha_m$ initially, then in order to achieve $\alpha_1$ or $\alpha_2$, an adjustment of either $\alpha_1 - \alpha_m = \delta_1$, or $\alpha_m - \alpha_2 = \delta_2$ is provided.

From the geometry of the construction illustrated in FIG. 5, the formula for angular correction of the position of the rollers is as follows:

$$\delta_{1,2} = \arccos\left[\frac{d_{1,2}\sin\beta}{B}\right] - \beta - \alpha_m$$

wherein:
$d_{1,2}$ is the diameter of the fed electrode wire,
B is the width of the roller, $$\beta = \arcsin\frac{B}{\left[\left[\frac{B + D_m\sin\alpha_m}{\cos\alpha_m}\right]^2 + D_m^2\right]^{\frac{1}{2}}}$$

$D_m$ is the predetermined mean electrode wire diameter for the roller profile, and
$\alpha_m$ is the angle between a reference axis 88 normal to the feed axis 14 and the roller.

It will be appreciated by persons skilled in the art, that the following further advantages are inherent in the hereinabove-described universal planetary feeder head 10 of the present invention:

1. Due to the fact that both the clearance and the force applied by rollers 26 onto an electrode wire are adjustable, compression member does not need to be changed for sizes and types of electrode wire.
2. As the angle of feed slide is also adjustable, true linear contact can be provided between the electrode wire and the hyperboloidal feed surfaces of the rollers for virtually any size of electrode wire, thereby allowing speeds of feeding that are much greater than those conventionally achievable.
3. Furthermore, due to the angle of feed slide being adjustable, it is also possible to achieve welding speeds at a reduction coefficient of greater than 1.
4. As both the normal force applied by the rollers to the electrode wire and also the angle of feed slide of the rollers are adjustable, electrode wire straightening is highly controllable and optimum results can be achieved.

Referring briefly now to FIGS. 6A and 6B, there is illustrated a body 18' of a feeder head (not shown) substantially as illustrated in any of FIGS. 1A–3 above, wherein body 18' is constructed according to an alternative embodiment of the invention. According to the illustrated example, grooves 78' and 80' are formed on a portion of body 18' so as to define therewith generally cylindrical recesses 90 arranged symmetrically about feed axis 14.

Each recess 90 is configured to seat therein a piston 20. The function of grooves 78' and 80' is similar to that of grooves 78 and 80 (FIGS. 1A–3), namely, to seat axles 24 and rollers 26 (FIG. 6B). In the present embodiment, however, as the grooves are formed directly on body 18', the feed slide angle is not adjustable.

As with the embodiment of the invention described above in conjunction with FIGS. 1A–3, however, the mounting of rollers 26 internally of pistons 20 and in coaxial registration therewith, ensures that translation of rollers 26 is permitted only in a radial direction. This is an important feature of the present invention, as it ensures that no bending of the rollers will occur during feeding, and, accordingly, substantially no misalignment will occur.

It follows, therefore, that the pistons and rollers of the feeder head of the present invention are able to provide maximum purchase on an electrode wire, thereby increasing the speed at which the electrode wire can be fed, and also straightening the electrode wire more efficiently than is possible with prior art devices.

Figure 7B:
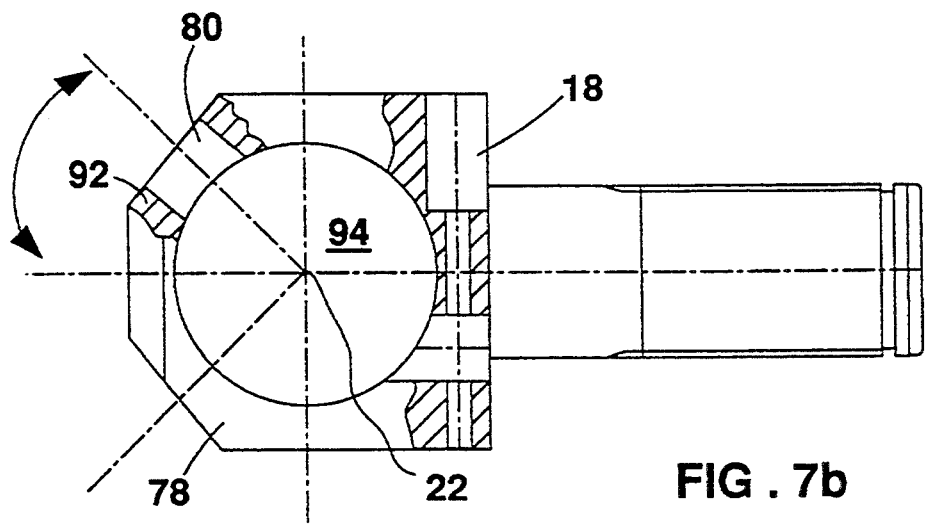
FIGS. 7A and 7B are respective side and top views of a body similar to that illustrated in FIGS. 6A and 6B, but in accordance with a further embodiment of the invention.
Figure 7A:
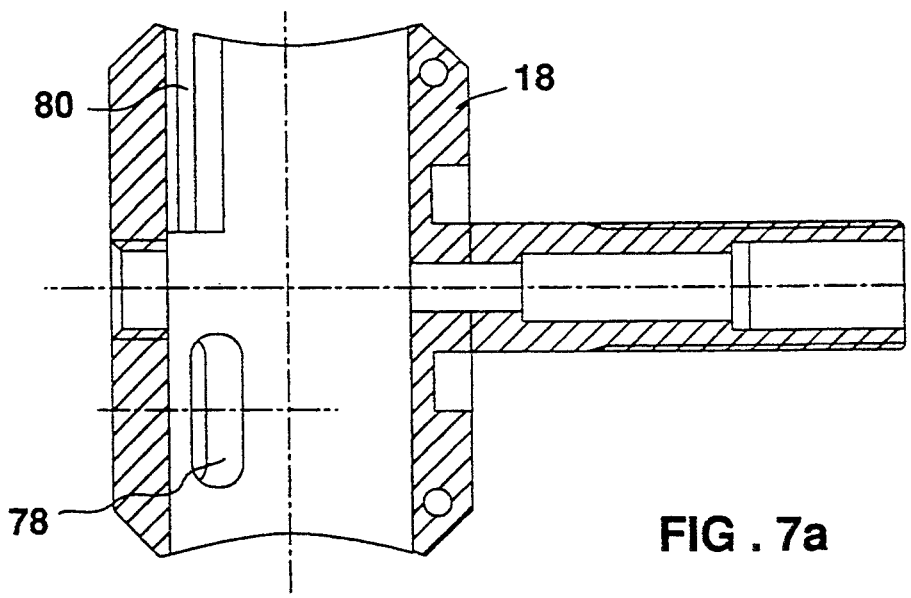

FIGS. 7A and 7B are respective side and top views of a body similar to that illustrated in FIGS. 6A and 6B, but wherein grooves 78' and 80' are formed so as to extend fully through a side wall 92 of body 18. A particular advantage of the present embodiment is in the relative simplicity of its manufacture wherein, initially, a simple cylinder 94 is formed and, thereafter, the grooves 78' and 80' are formed from the exterior of the body.

Figure 8B:
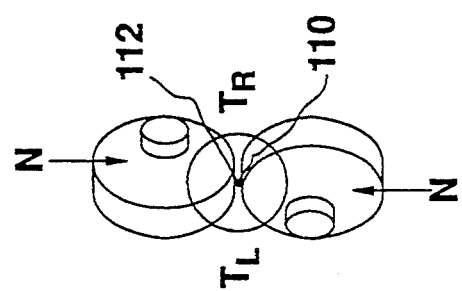
FIG. 8B is a diagrammatic illustration of direct and torsional stresses applied to an electrode wire during feeding thereof by the feeder of FIG. 8A.
Figure 8A:
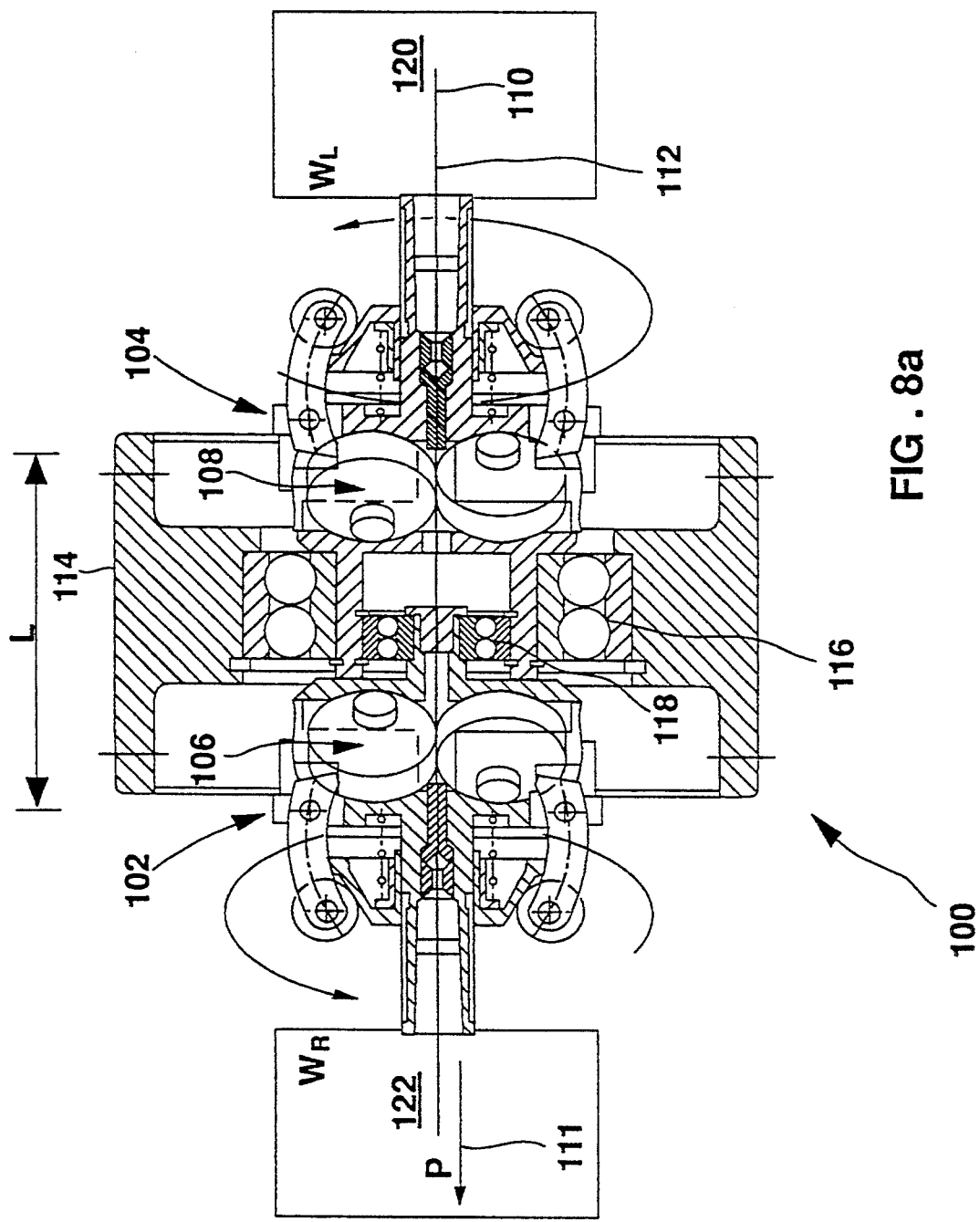
FIG. 8A is a cross-sectional illustration of an integral, double motion, planetary feeder constructed and operative in accordance with a preferred embodiment of the present invention.

Referring now to FIG. 8A, there is provided a integrally formed, double action, planetary, wire feeder, referenced generally 100, constructed in accordance with a preferred embodiment of the present invention. Feeder 100 is characterized by the provision of a pair of planetary feeder units, respectively referenced 102 and 104, which employ oppositely rotating right-handed and left-handed pairs of planetary rollers respectively referenced 106 and 108. According to the illustrated embodiment, roller pair 106 of feeder unit 102 rotates in a generally right-handed direction and roller pair 108 of feeder unit 104 rotates in a generally left-handed direction.

In operation, respective roller pairs 106 and 108 revolve about a feed axis 110 at similar rotational speeds, and roller pairs 106 and 108 engage an electrode wire 112 positioned therebetween along feed axis 110.

As shown diagrammatically in FIG. 8B, the roller pairs apply to the wire forces which have direct force components 'N' perpendicular to axis: 110, torsional force components 'T' about axis 110, generally tangential force components (not indicated), and a resultant feed force 'P' along the axis in a feed direction indicated by arrow 111 (FIG. 8A). Right-handed roller pair 106 applies a torsional component $T_R$ to wire 112, and left-handed roller pair 108 applies to wire 112 a torsional component $T_L$ in a sense opposite to that of $T_R$. As the respective roller pairs revolve about axis 110 at similar speeds and are of similar size and configuration, it follows that the respective magnitudes of torsional components $T_R$ and $T_L$ are also similar, such that the net torsional force on the wire 112 approximates to zero.

It will thus be appreciated that, as the wire experiences little or no twisting, the length of the conduit through which it may be fed may be greatly increased in comparison with the prior art. According to the present invention, therefore, the length of a feed conduit may be increased to as much as 4.5–8.0 m. This represents an increase of 50–100% over the length of feed conduits that may be used with conventional planetary feeders.

According to the present invention, provided that the roller pairs 106 and 108 are positioned to as to apply mutually opposite and equal torsional force components to wire 112 as described above, each of the planetary feeder units 102 and 104, when taken alone, may either be of any of the novel constructions described hereinabove in conjunction with any of FIGS. 1A–7B, or of any suitably adapted conventional construction.

In the present example, feeder units 102 and 104 are constructed, as shown, in accordance with the feeder heads shown and described above in conjunction with any of FIGS. 1A–7B, and are not, therefore, described herein in detail except as may be necessary for a more complete understanding of the present embodiment.

In accordance with the present invention, the distance 'L' between the respective points of engagement of the two roller pairs 106 and 108 is sought to be kept to a minimum, thereby minimizing the instantaneous torsional force applied to a given portion of wire 112 prior to its engagement by left-handed roller pair 108.

In the present embodiment feeder units 102 and 104 are mounted onto a common mounting block 114 via suitable bearings 116 and 118. Rotation of the feeder units may be provided by motors 120 and 122 synchronized by any suitable gear transmission (not shown).

FIGS. 9–22 are illustrations of various embodiments of the double action, planetary, wire feeders of the invention, each employing left- and right-handed feeder units. The construction of these feeder units per se may be similar to those employed in the feeder 100 of FIG. 8A. Accordingly, the right-handed and left-handed feeder units are respectively denoted, where necessary, by reference numerals 102 and 104 throughout the ensuing description hereinbelow.

Figure 9:
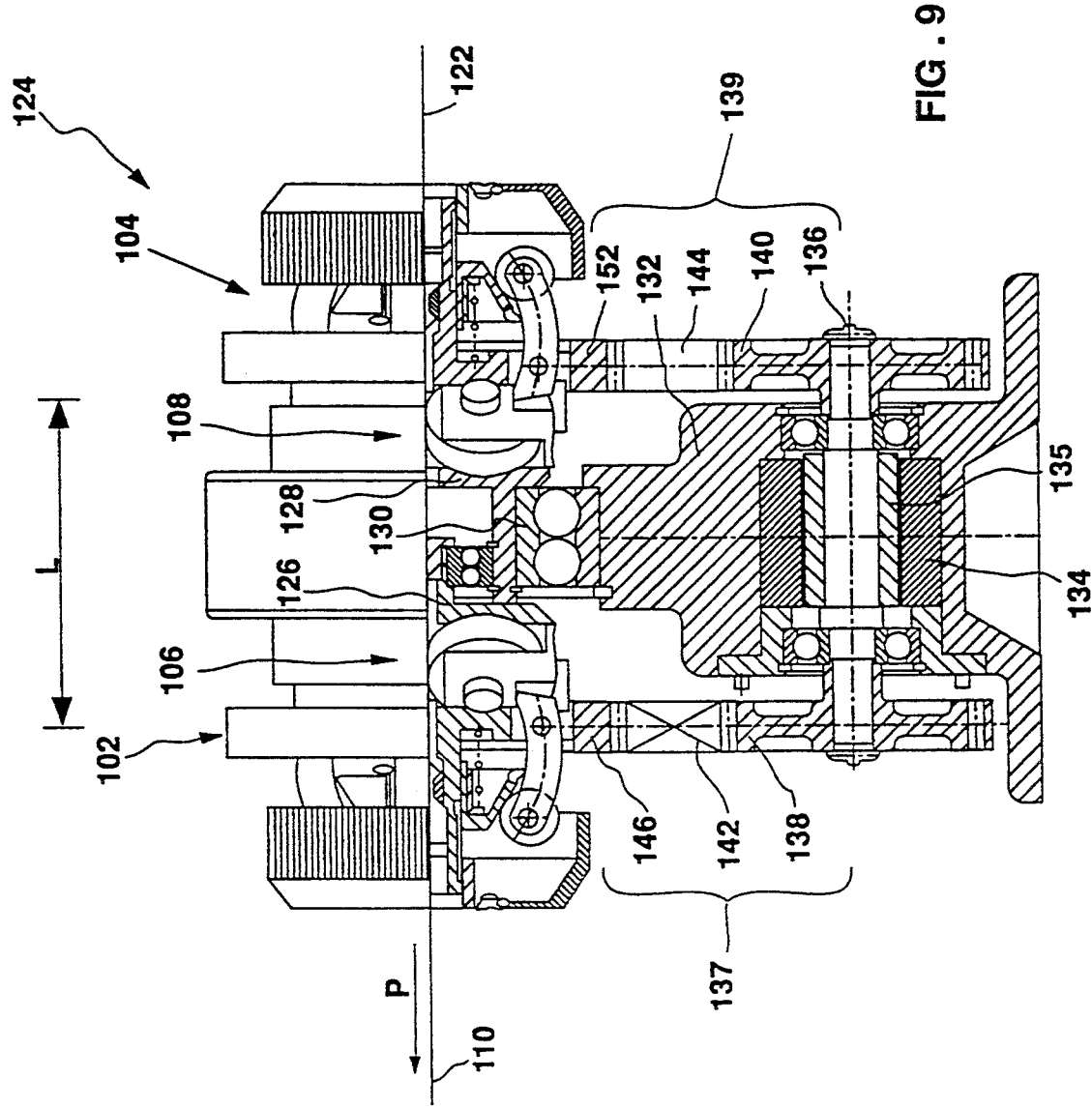
FIGS. 9, 10 and 11 are schematic illustrations of various double action feeders similar to the feeder of FIG. 8A, but wherein each head unit is driven by a separate drive belt.
Figure 10:
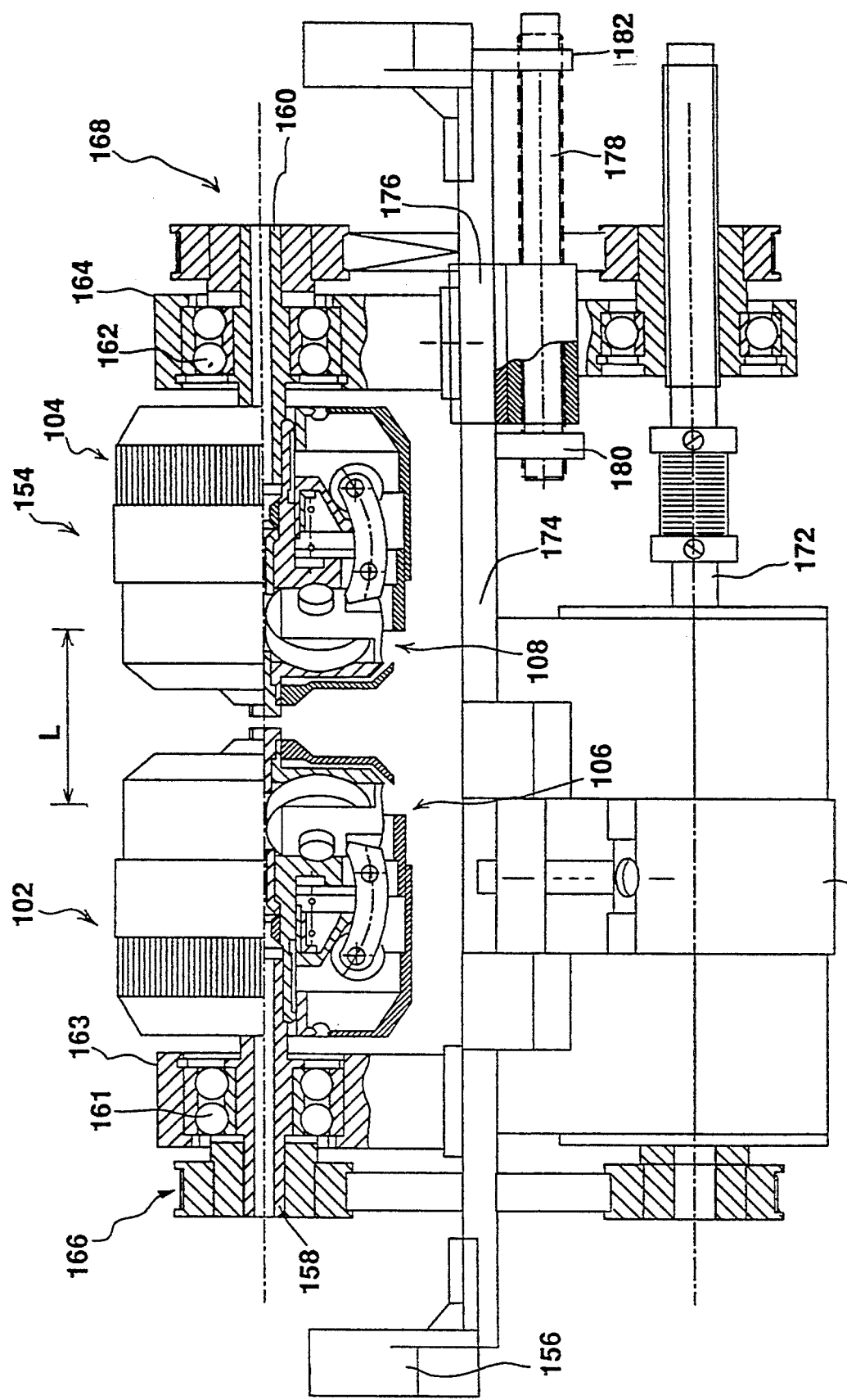
Figure 11:
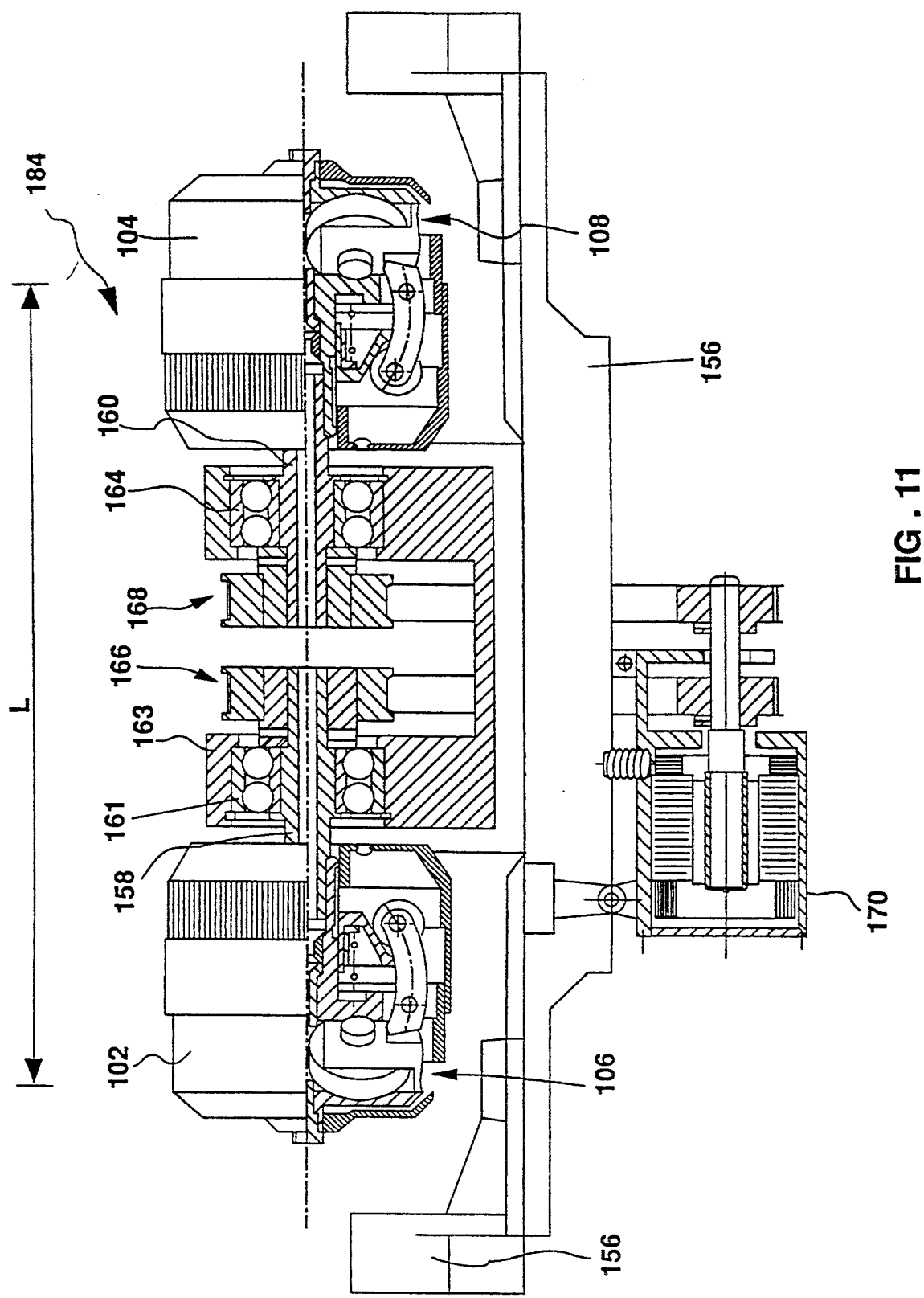

Reference is now made to FIGS. 9, 10 and 11, in which are illustrated various double action wire feeders that are generally similar to the feeder 100 of FIG. 8A, but wherein each right-handed and left-handed feeder unit is driven by a separate drive belt. Of the feeders in FIGS. 9, 10 and 11, the feeders in FIGS. 9 and 10 employ inward-facing roller pairs 106 and 108, while the feeder in FIG. 11 employs outward-facing roller pairs 106 and 108. It will be appreciated that, while each particular embodiment has its own particular advantages, and that while the herein-described feeders employing outward-facing roller pairs enable use of a feed conduit that is much larger than can be used with conventional planetary feeders, the length of a feed conduit that may be used in conjunction with the present invention is inversely proportional to the distance L between the roller pairs.

Referring now particularly to FIG. 9, there is provided a double action, planetary feeder 124 wherein the right-handed feeding unit 102 has a body 126 that is connected to a similar body 128 of the left-handed feeding unit 104 via a bearing 130. Both the right-handed and left-handed units 102 and 104 are mounted, via their respective bodies 126 and 128, onto a common mounting block 132.

An electric motor 134 is mounted onto mounting block 132 and is adapted, via a runner 135 and a shaft 136, and via respective right- and left-handed drive assemblies, respectively referenced 137 and 139, to drive the right- and left-handed feeder units in opposite directions about feed axis 110.

Figure 12:
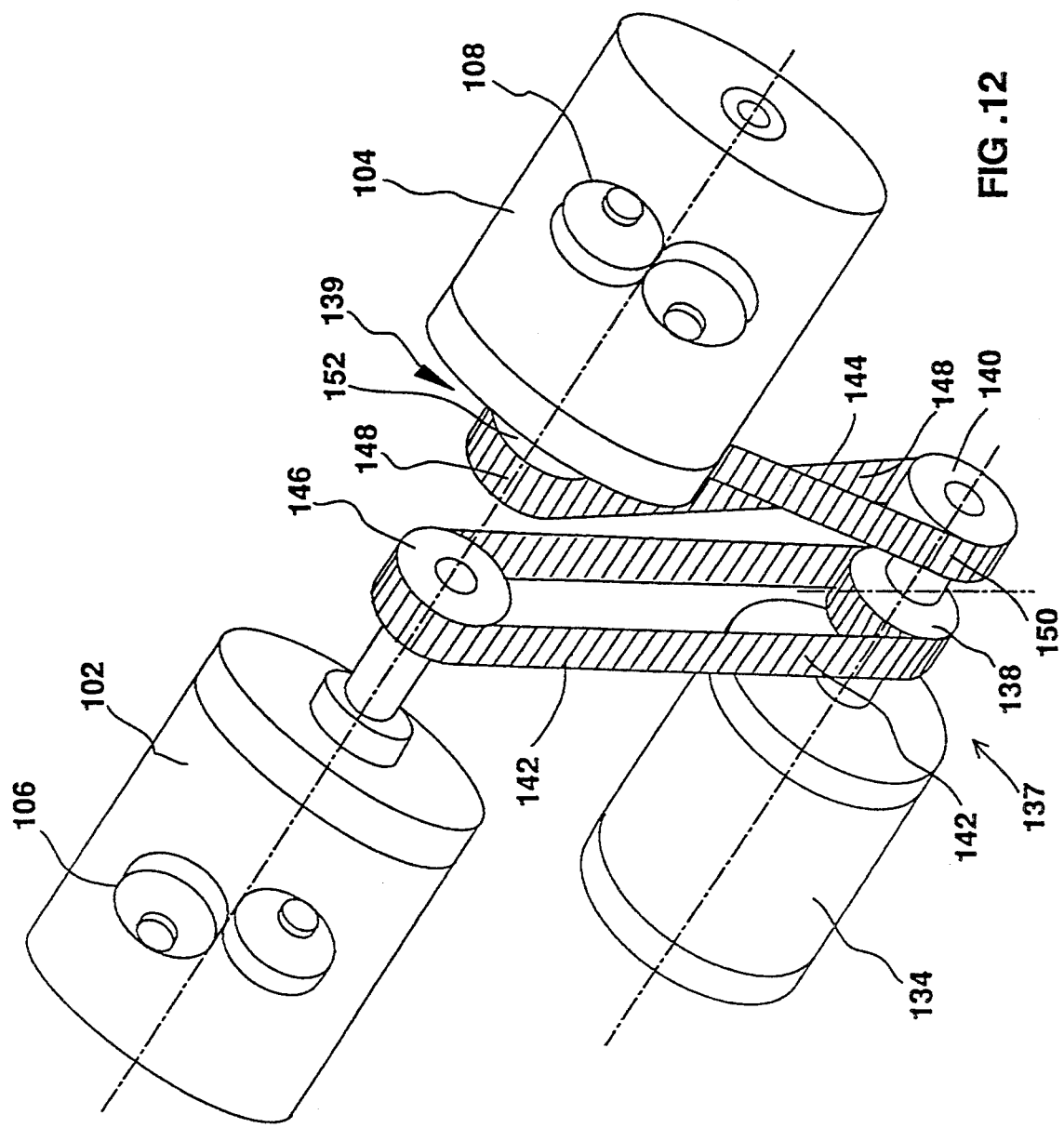
FIG. 12 is a schematic representation of operation of the feeder of FIGS. 9 and 11.

Referring now also to FIG. 12, right-handed drive assembly 137 includes a first gear wheel 138, a single-sided toothed drive belt 142 and second gear wheel 146. Left drive assembly 139 includes a first gear wheel 140, a double-sided drive belt 144 having first and second toothed sides 148 and 150, and a second gear wheel 152.

Motor 134 is operative to drive first gear wheels 138 and 140 which, in turn, rotate respective right-handed and left-handed drive belts 142 and 144. Right-handed drive belt 142 is operative to drive second gear wheel 146, attached to right-handed feeder unit 102, in the same rotational sense as the motor.

Left drive belt 144 is crossed such that first toothed surface 148 thereof is drivingly engaged by first gear wheel 140, and such that the second toothed surface 150 is drivingly with a second gear wheel 152 associated with left-handed feeder unit 104. Accordingly, left-handed feeder unit 104 is driven in an opposite direction to the motor and, therefore, a direction opposite to that of right-handed feeder unit 102.

Referring now to FIG. 10, there is provided a double action, planetary, wire feeder referenced generally 154. Feeder 154 is generally similar to the feeder 124 of FIG. 9, except that, in the present embodiment, right- and left-handed feeder units 102 and 104 are separately and adjustably mounted onto a mounting frame 156. An advantage of this arrangement is that access to the feeder units for maintenance is conveniently provided by sliding of the left-handed unit 104 away from the right-handed unit 102 along the mounting frame 156.

In the present embodiment, right- and left-handed units 102 and 104 are mounted onto respective axles 158 and 160 which are mounted onto mounting frame 156 via bearings 161 and 162 and mounting brackets 163 and 164. Right-handed and left-handed planetary roller pairs 106 and 108 are provided at respective inward-facing portions of the feeder units 102 and 104, while respective right-handed and left-handed drive assemblies 166 and 168 are provided at respective outward-facing portions of the feeder units. Drive assemblies 166 and 168 are similar to respective drive assemblies 137 and 139 shown and described above in conjunction with FIG. 9 and are not, therefore, described again herein.

A motor 170 which has a shaft 172 is operative to drive transmission assemblies 166 and 168 substantially as described above in conjunction with transmission assemblies 137 and 139 of the embodiment of FIG. 9.

It will be appreciated that, while, in the present example, right-handed feeder unit 102 is mounted in a generally fixed on mounting frame 156, left-handed feeder unit 104 and its drive assembly 168 are slidably adjustable along the mounting frame. Mounting bracket 164 is associated with a base portion 174 of mounting frame 156 but is not attached thereto. Rather, a lower portion 176 of bracket 164 defines a bottom portion 178 that is configured for sliding movement along the base portion 174, this movement being governed by an adjustable screw mechanism 178 mounted between a pair of fixed protrusions 180 and 182 attached to mounting frame 156.

Referring now to FIG. 11, there is provided a double action, planetary, wire feeder referenced generally 184. Except as specifically described hereinbelow, feeder 184 is generally similar to the feeder 154 of FIG. 10, and is thus not described herein in detail. In the present embodiment, right- and left-handed feeder units 102 and 104 may be accessed for maintenance not by means of being adjustably mounted, but by their being mounted such that their respective roller pairs 106 and 108 are outward-facing.

Accordingly, right-handed and left-handed planetary roller pairs 106 and 108 are provided at respective outward-facing portions of the feeder units 102 and 104, while respective right-handed and left-handed drive assemblies 166 and 168 are provided in mutually adjacent positions, at respective inward-facing portions of the feeder units.

Figure 13:
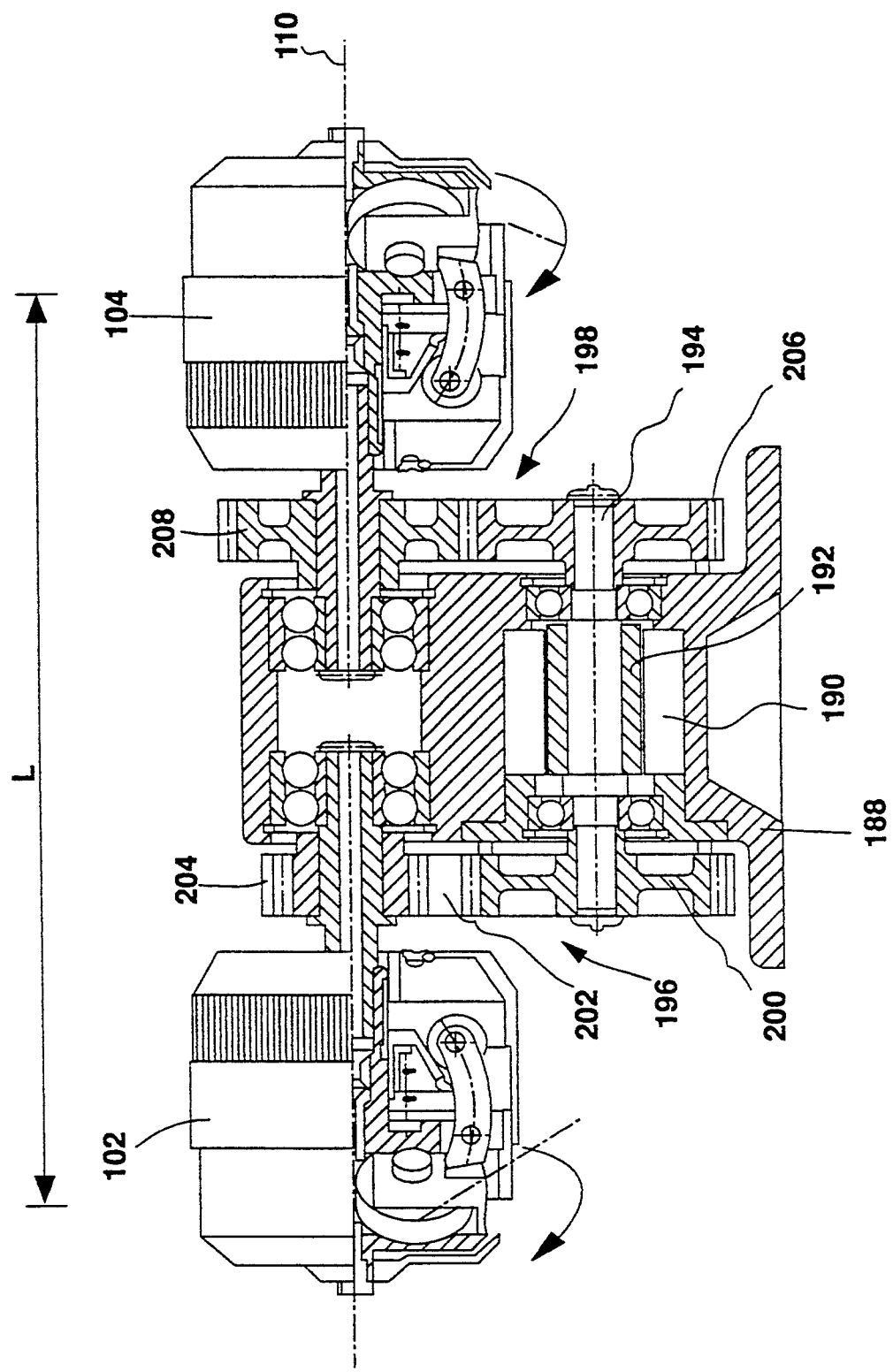
FIG. 13 is a cross-sectional illustration of a double action feeder constructed according to a further embodiment of the invention.

Referring now to FIG. 13, there is shown a double action feeder, referenced generally 186, wherein the right- and left-handed feeder units 102 and 104 are positioned so as to be outward-facing, such as in feeder 184 (FIG. 12), and which are mounted onto a common mounting block 188, similar to mounting block 132 of feeder 124 (FIG. 9).

An electric motor 190 is mounted onto mounting block 188 and is adapted, via a runner 192 and a shaft 194, and via respective right-handed and left-handed drive assemblies, respectively referenced 196 and 198, to drive the right- and left-handed feeder units in opposite feed directions about feed axis 110.

Figure 14C:
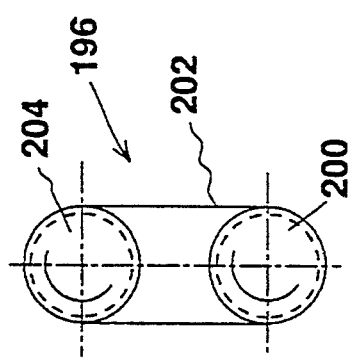
FIGS. 14B and 14C are schematic side views of the feeder of FIG. 13 illustrating operation thereof, respectively taken in the direction lines B—B and C—C in FIG. 13.
Figure 14B:
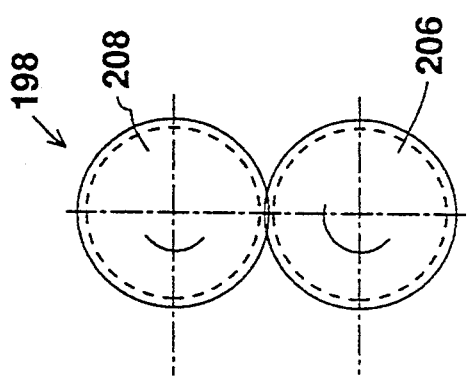
Figure 14A:
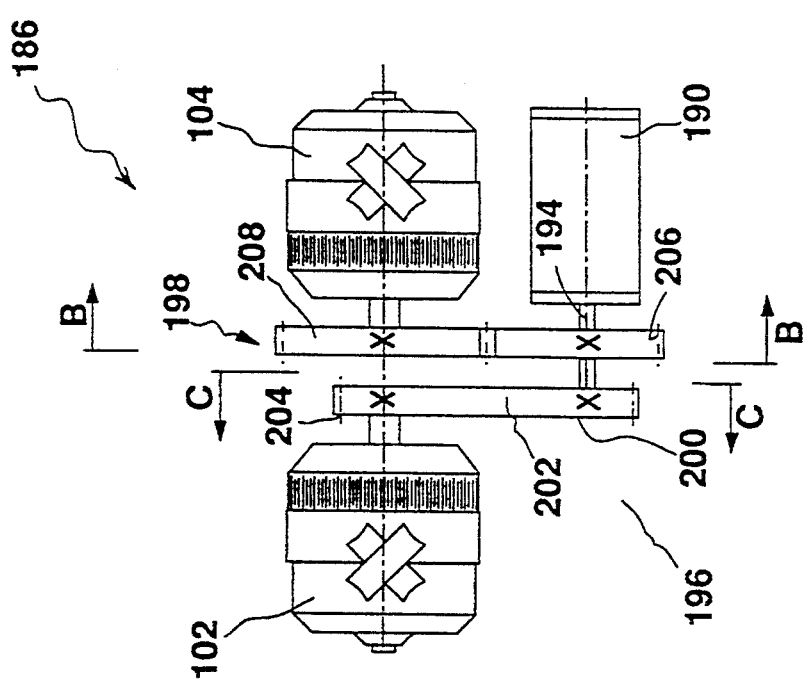
FIG. 14A is a schematic front view of the feeder of FIG. 13.

Referring now also to FIGS. 14A–14C, right-handed drive assembly 196 (FIG. 14C) includes a first gear wheel 200, a single-sided toothed drive belt 202 and a second gear wheel 204. Left drive assembly 198 includes a first gear wheel 206 and a second gear wheel 208.

Motor 190 is operative to drive first gear wheels 200 and 206. First gear wheel 200 is operative to drivingly engage drive belt 202 which, in turn, causes rotation of second gear wheel 204, thereby rotating right-handed feeder unit 102 in a direction parallel to the direction of rotation of the motor shaft 194. First gear wheel 206 is operative to drivingly engage second gear wheel 208, thereby to drive left-handed feeder unit 104 in a direction opposite to that in which the motor shaft is rotated and, therefore, a direction opposite to that of right-handed feeder unit 102.

Figure 15C:
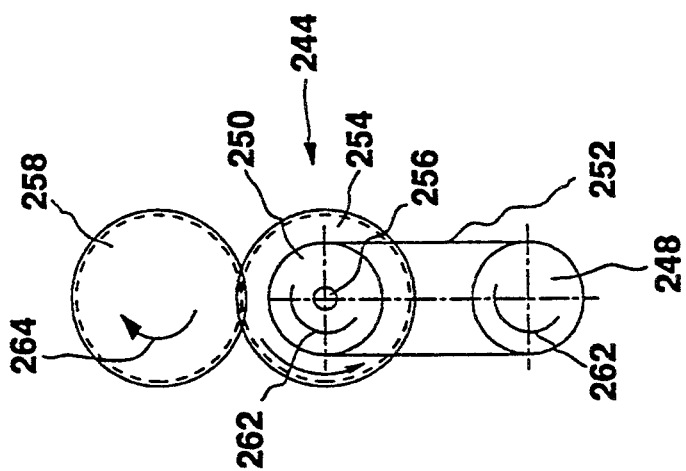
FIGS. 15B and 15C are respective side views of the right-handed and left-handed drive assemblies of the feeder of FIG. 15A, taken along lines B—B and C—C respectively.
Figure 15B:
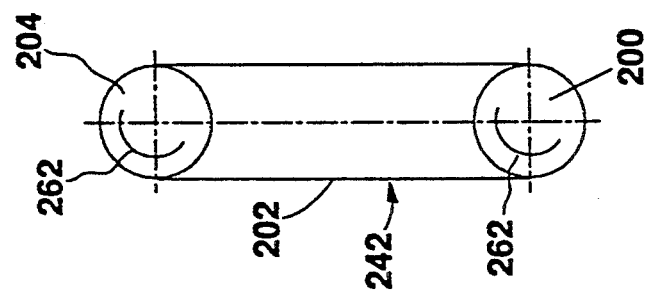
Figure 15A:
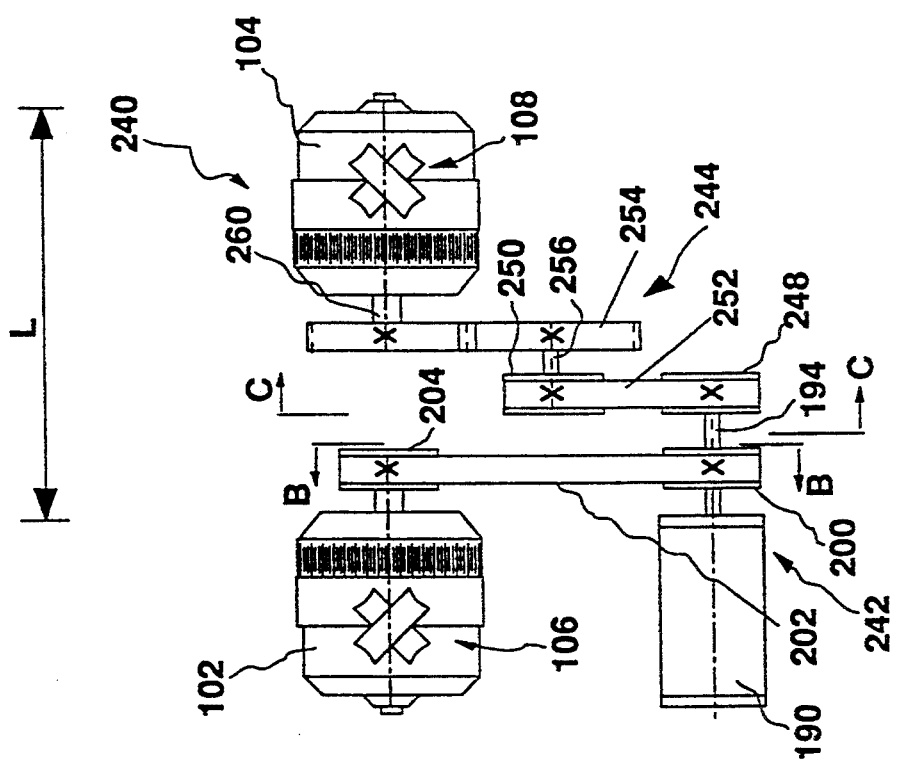
FIG. 15A is a schematic side view illustration of a double action feeder having a transmission which employs a toothed belt, an idler gear wheel and a toothed gear transmission.

Referring now to FIGS. 15A–15C, there is illustrated schematically a feeder, referenced generally 240, which employs a transmission that is generally similar to that of the embodiment of FIGS. 13–14C. Feeder 240 employs respective right- and left-handed drive assemblies 242 and 244. Right-handed drive assembly 242 is similar to right-handed drive assembly 196 of feeder 186 (FIGS. 13–14C) and is thus not described herein in detail.

Left-handed drive assembly 244 includes a first gear wheel 248 mounted onto shaft 194 of motor 190, a satellite gear belt wheel 250, and a drive belt 252 via which first gear wheel 248 drives satellite wheel 250. A second gear wheel 254 is mounted onto an axle 256 together with satellite wheel 250 so as to be rotatable therewith. Rotation of second gear wheel 254 produces an opposite rotation of a third gear wheel 258 that is mounted onto an axle 260 of left-handed feeder unit 104.

In operation, motor 190 is operative to drive first gear wheels 200 and 248. First gear wheel 200 is operative to drivingly engage drive belt 202 which, in turn, causes rotation of second gear wheel 204, thereby rotating right-handed feeder unit 102 in a direction parallel to the direction of rotation of the motor shaft 194. This direction is indicated by arrows referenced 262.

First gear wheel 248 is operative to cause rotation of satellite wheel 250 via drive belt 252, thereby also to cause rotation of second gear wheel 254 in a similar direction, thereby to cause a rotation of third gear wheel 258, and thus the left-handed roller pair 108, in an opposite direction indicated by arrow 264.

Figure 16C:
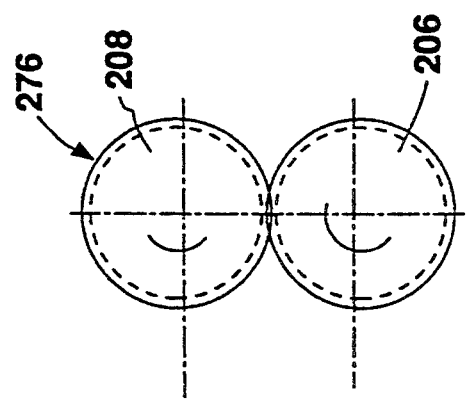
FIGS. 16A–16C are various schematic side view illustrations of a double action feeder having a transmission that is generally similar to that of FIGS. 15A–15C, but which employs gear wheels and an idler wheel only.
Figure 16B:
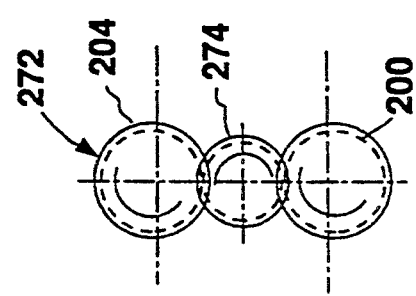
Figure 16A:
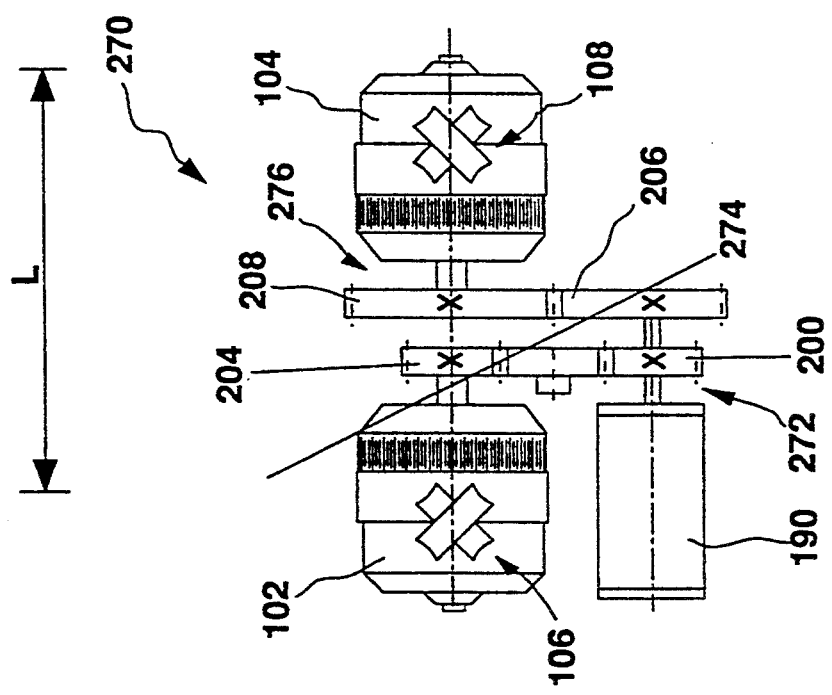

Illustrated in FIGS. 16A–16C is yet a further variation of the feeder 186 of FIGS. 13–14C. In the present embodiment, a feeder 270 has a right-handed drive assembly 272 that employs an idler wheel 274 between first and second gear wheels 200 and 204 so as to provide a rotational motion of right-handed feeder unit 102 that is in the opposite direction to that imparted to left-handed feeder unit 104. A left-handed drive assembly 276 is substantially the same as left-handed drive assembly 198 of the feeder 186 of FIGS. 13–14C and is thus not described herein.

Figure 17C:
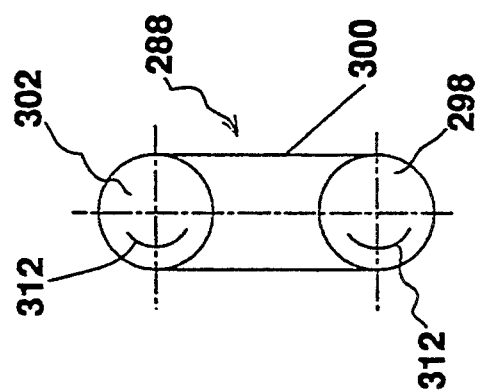
FIGS. 17A–17C are respective front and partial side views of an outward-facing double-action, planetary feeder constructed according to an alternative embodiment of the invention.
Figure 17B:
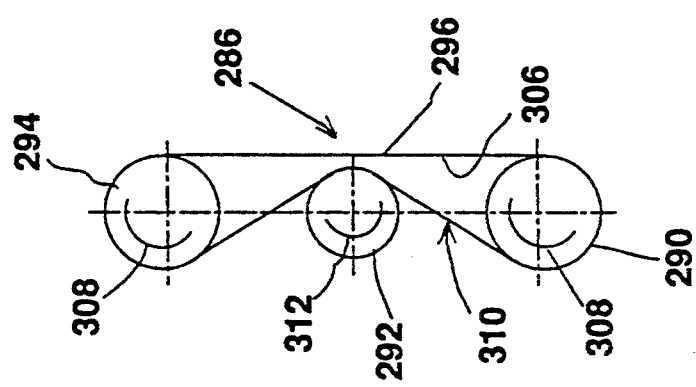
Figure 17A:
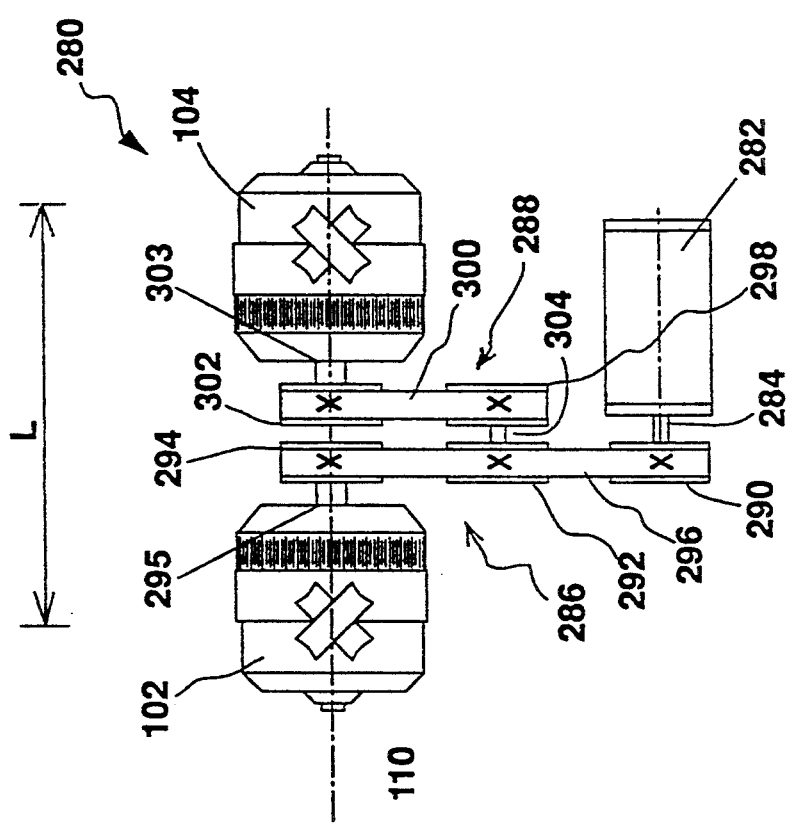

Reference is now made to FIGS. 17A–17C which are respective front and partial side views of an outward-facing double-action, planetary feeder 280 constructed according to a further embodiment of the invention.

Feeder 280 employs, in an outward-facing arrangement, respective right- and left-handed planetary feeder units 102 and 104 substantially as described above in conjunction with any of FIGS. 11, 12, 13, 14A, 15A and 16A and which are not, therefore, described again herein.

An electric motor 282 is adapted to drive the right- and left-handed feeder units in opposite directions about feed axis 110 via a shaft 284 and respective right- and left-handed drive assemblies, respectively referenced 286 and 288.

Right-handed drive assembly 286 includes a first gear wheel 290 mounted onto motor shaft 284, a satellite wheel 292, a second gear wheel 294 mounted onto an axle 295 of right-handed feeder unit 102, and a double-sided toothed drive belt 296. Left drive assembly 288 includes a first gear wheel 298, a single-sided drive belt 300 and a second gear wheel 302 mounted onto an axle 303 of right-handed feeder unit 104. Satellite wheel 292 and first gear wheel 298 of the left-handed drive assembly 288 are rotatably connected via a common axle 304.

Motor 282 is operative to drive first gear wheel 290 which is operative to drivably engage a first toothed side 306 of two-sided drive belt 296 so as to drive second gear wheel 294 in a direction indicated by an arrow 308 (FIG. 17B), and thereby to drive right-handed feeder unit 102 in the same direction. Drive belt 296 is arranged such that a second side thereof, referenced 310, drivably engages satellite wheel 292. Wheel 292 and first and second gear wheels 298 and 302 of the second drive assembly 288 are thus rotated in a direction, indicated by an arrow 312, opposite to the direction of rotation of the motor shaft 284.

Referring now to FIGS. 18A and 18B, 19 and 20, there are schematically illustrated various feeders. The three feeders are characterized by having inward-facing roller pairs, and having variously configured transmission assemblies which employ a single drive belt for simultaneously driving the right- and left-handed feeder units 102 and 104 in opposite directions.

Figure 18B:
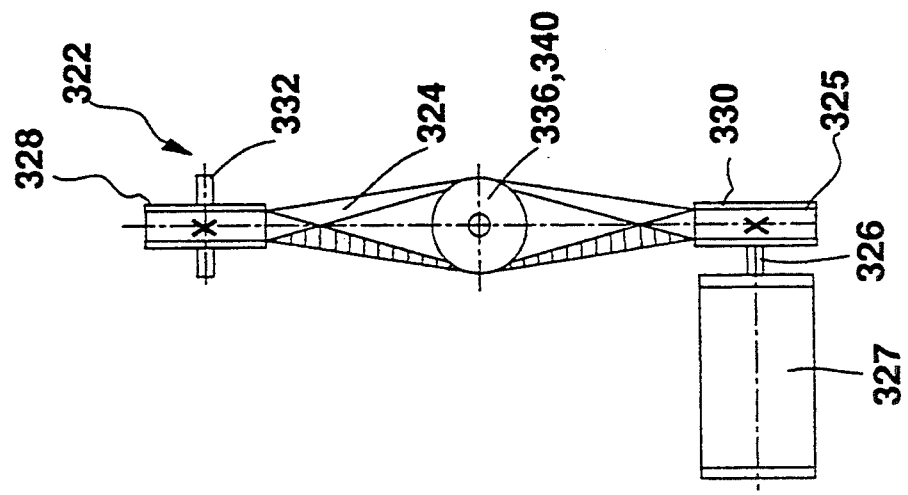
FIGS. 18A, 18B, 19 and 20 are schematic illustrations of various double action, belt-driven feeders employing single drive belts of various configurations.
Figure 18A:
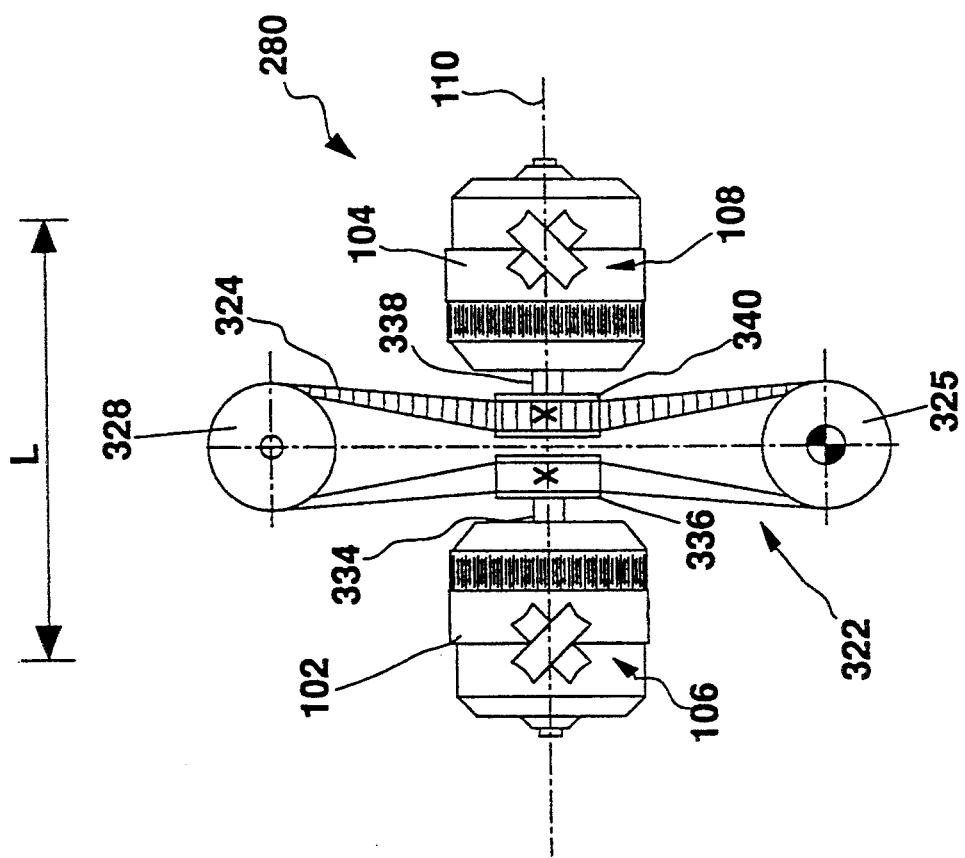

In FIGS. 18A and 18B there is illustrated a feeder 320, which may be constructed similarly to either of the feeders shown and described above in conjunction with FIGS. 11 and 13, with the exception of the drive assembly employed in the present embodiment.

Feeder 320 employs a drive assembly 322 which includes a single-sided toothed drive belt 324, a drive wheel 325 mounted onto a drive shaft 326 of a motor 327, and a satellite wheel 328. Wheels 325 and 328 are mounted for rotation about parallel axes, respectively referenced 330 and 332. Right-handed feeder unit 102 has attached to an axle 334 thereof a gear wheel 336 for driving engagement with drive belt 324. Left-handed feeder unit 104 has attached to an axle 338 thereof a gear wheel 340 for driving engagement with drive belt 324.

As shown in the illustration, the drive belt is arranged such that its toothed side, referenced 342, engages each of the four wheels 326, 328, 336 and 340. Operation of motor 327 causes rotation of the four wheels via the drive belt, thereby causing mutually opposite rotation of the right- and left-handed feeder units 102 and 104.

Figure 19:
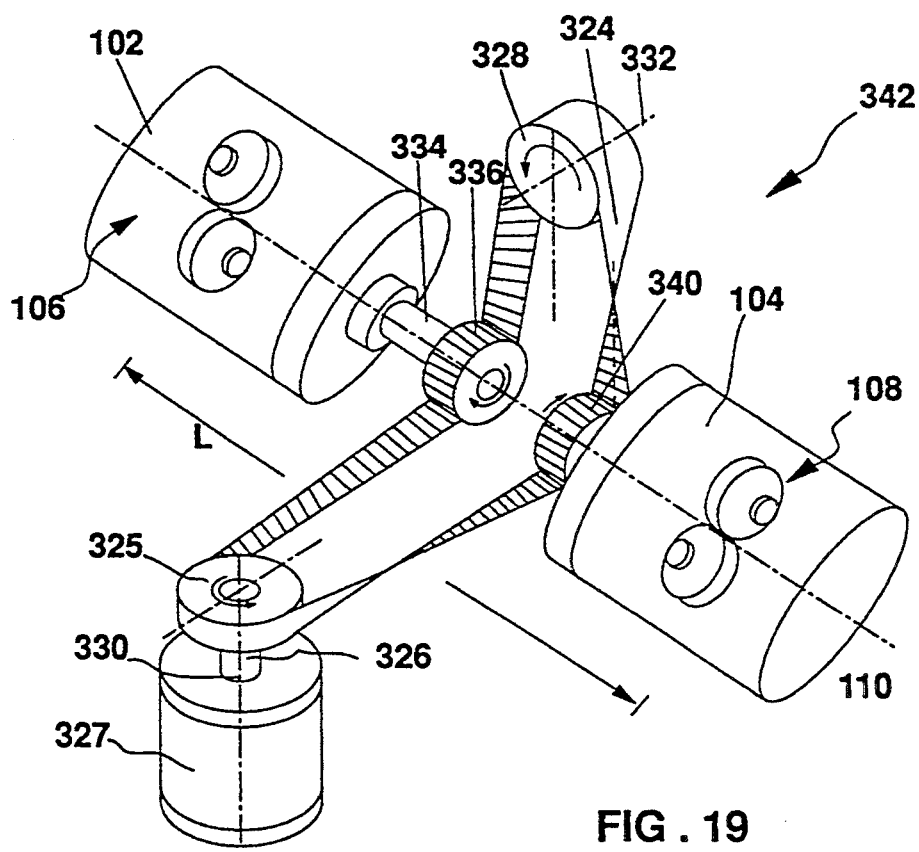

With reference now to FIG. 19, there is illustrated a feeder 342 which is similar to the feeder of FIGS. 18A and 18B, except that, in the present embodiment, drive wheel 325 and satellite wheel 328 are arranged so as to rotate about respective axes 330 and 332 that are mutually perpendicular rather than parallel.

Figure 20:
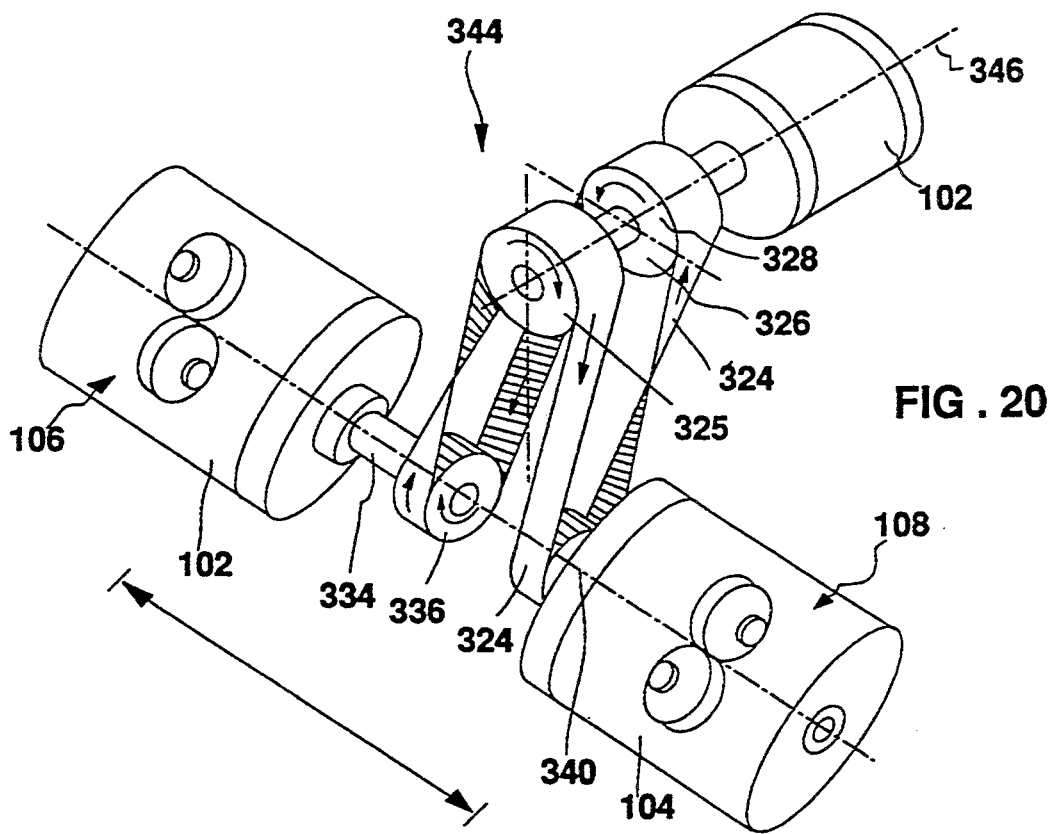

With reference now to FIG. 20, there is illustrated a feeder 344 which is similar to the feeders of FIGS. 18A and 18B and 19, except that, in the present embodiment, drive wheel 325 and satellite wheel 328 are arranged so as to rotate about a common axis 346 defined by the motor shaft 326. According to the present embodiment, although satellite wheel is mounted onto motor shaft 326 it is mounted thereon, as by suitable bearings (not shown) so as not to be driven thereby, but instead, to be driven by drive belt 324. In an alternative embodiment, satellite wheel may be mounted coaxially with but separately from motor shaft 326.

Referring now to FIG. 21, there is shown a double action feeder 210 employing a toothed differential transmission in accordance with an alternative embodiment of the present invention. In the present embodiment, respective right- and left-handed feeder units 102 and 104 are arranged such that respective roller pairs 106 and 108 thereof are outward-facing.

Feeder units 102 and 104 are driven by an electric motor 212 which drives a differential transmission 214. Transmission 214 comprises a drive cone gear wheel 216 which is mounted on a motor shaft 218. Right-handed feeder unit 102 has attached thereto via an axle 220 a first cone gear wheel 222. Left-handed feeder unit 104 has attached thereto via an axle 224 a second cone gear wheel 226. Units 102 and 104 and motor 212 are arranged such that gear wheels 216 and 222, and 216 and 226 are drivingly engaged, so as to provide respective opposite rotations of units 102 and 104.

Referring now to FIG. 22, there is shown a double action feeder 230 employing a toothed differential transmission 232 that is generally similar transmission 214, except that an idler wheel 234 is provided between first and second gear wheels 222 and 226, and motor 212 and drive wheel 216 are mounted externally thereof. In the present embodiment therefore, drive wheel 216 directly engages second gear wheel 226 only. As second gear wheel 226 is rotated by drive wheel 216, the rotational motion of gear wheel 226 is transmitted to first gear wheel 222 via idler wheel 234, thereby to provide rotation of first gear wheel 222 and, accordingly, right-handed feeder unit 102, in a direction opposite to that in which left-handed feeder unit 104 is rotated.

Figures 23A, 23B:
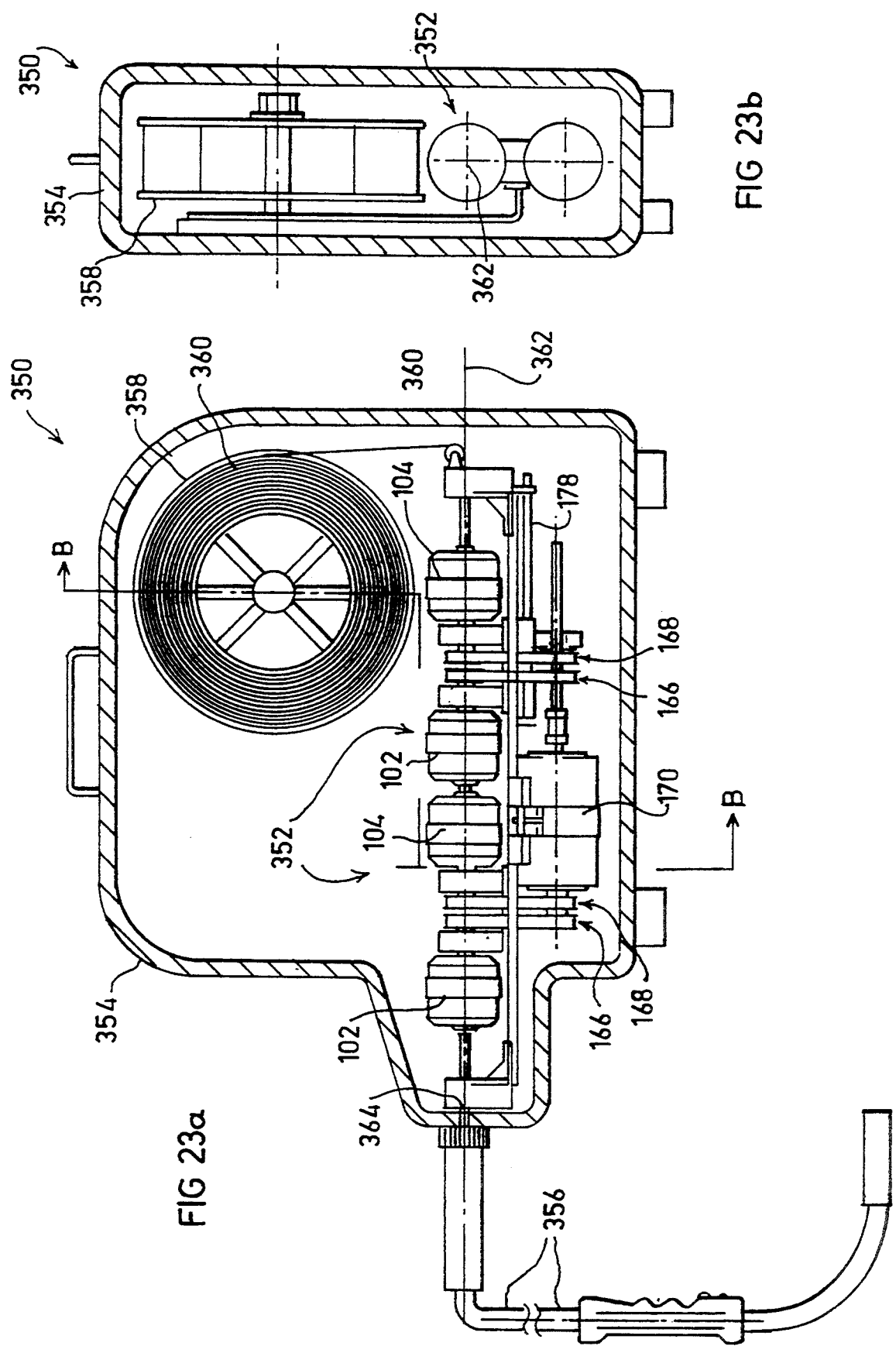
FIGS. 23A and 23B are side-sectional illustrations of welding apparatus employing a pair of double-action push-feeders constructed substantially as illustrated in FIG. 11.

Reference is now made to FIGS. 23A and 23B, in which is illustrated welding apparatus, referenced generally 350, in which are provided a pair of double-action push-feeders 352 constructed and operative in accordance with the present invention. In the present embodiment, feeders 352 are substantially as shown and described above in conjunction with FIG. 11 with the addition of the adjustable screw mechanism 178 of FIG. 10, and are therefore not described again herein. Feeder components are denoted herein by the same reference numerals as appear in FIG. 11. It will be appreciated, however, that feeders 352 may be of substantially any of the feeders shown and described hereinabove in conjunction with any of FIGS. 8A–22.

Apparatus 350 comprises a housing 354, a feed conduit 356 and a welding head 357. Housing 354 is adapted to contain a freely rotatable reel 358 holding an electrode wire 360 such that the wire may be freely fed by the pair of double-action feeders 352 also mounted in the housing. Feeders 352 are mounted so as to feed wire 360 along a common feed axis 362 and into a first opening 364 of feed conduit 356. Conduit 356 communicates with welding head 357 so as to permit feeding of the wire therethrough. A length of conduit 356 may lie in a typical range of 3.0–4.5 m and may be augmented to 6–8 meters, depending on the type of feeder used, the diameter and stiffness of the wire, and the speed at which it is sought to feed the wire.

Referring now to FIG. 24, there is shown a gooseneck type of welding gun, referenced generally 370, employing a double-action feeder 372, constructed and operative in accordance with an embodiment of the present invention. In the present example, feeder 372 is constructed generally as illustrated in FIG. 11 and is therefore not generally described again herein except as necessary for understanding of the present embodiment. Feeder components are denoted herein by the same reference numerals as appear in FIG. 11.

In the present embodiment, so as to adapt the feeder configuration of FIG. 11 to the illustrated goose-neck welding gun, mounting frame 156 (FIG. 11) is not provided, drive assemblies 166 and 168 are provided directly adjacent to their respective right- and left-handed feeder units 102 and 104, and motor 170 is located between the drive assemblies. Motor 170 further has a double-ended drive shaft 373, each end being adapted to drivingly engage an associated drive assembly. It will be appreciated that the illustrated modification to the feeder of FIG. 11 provides for a generally more slender and elongate feeder configuration and one which is thus more suited for fitting into a goose-neck type welding gun.

In an alternative embodiment feeder 372 may be of substantially any of the feeders described hereinabove.

Welding gun 370 is associated with a feed conduit 374 and comprises a housing 376 and a welding head 378. Housing 376 is adapted to contain double-action feeder 372 so as to feed an electrode wire 376 through feed conduit 374 and along a feed axis 378 about which feeder 372 revolves when in operation. A length of conduit 374 may lie in a typical range of 3.0–4.5 m and may be augmented to 16–28 meters, depending on the type of feeder used, the diameter and stiffness of the wire, and the speed at which it is sought to feed the wire.

Figure 25:
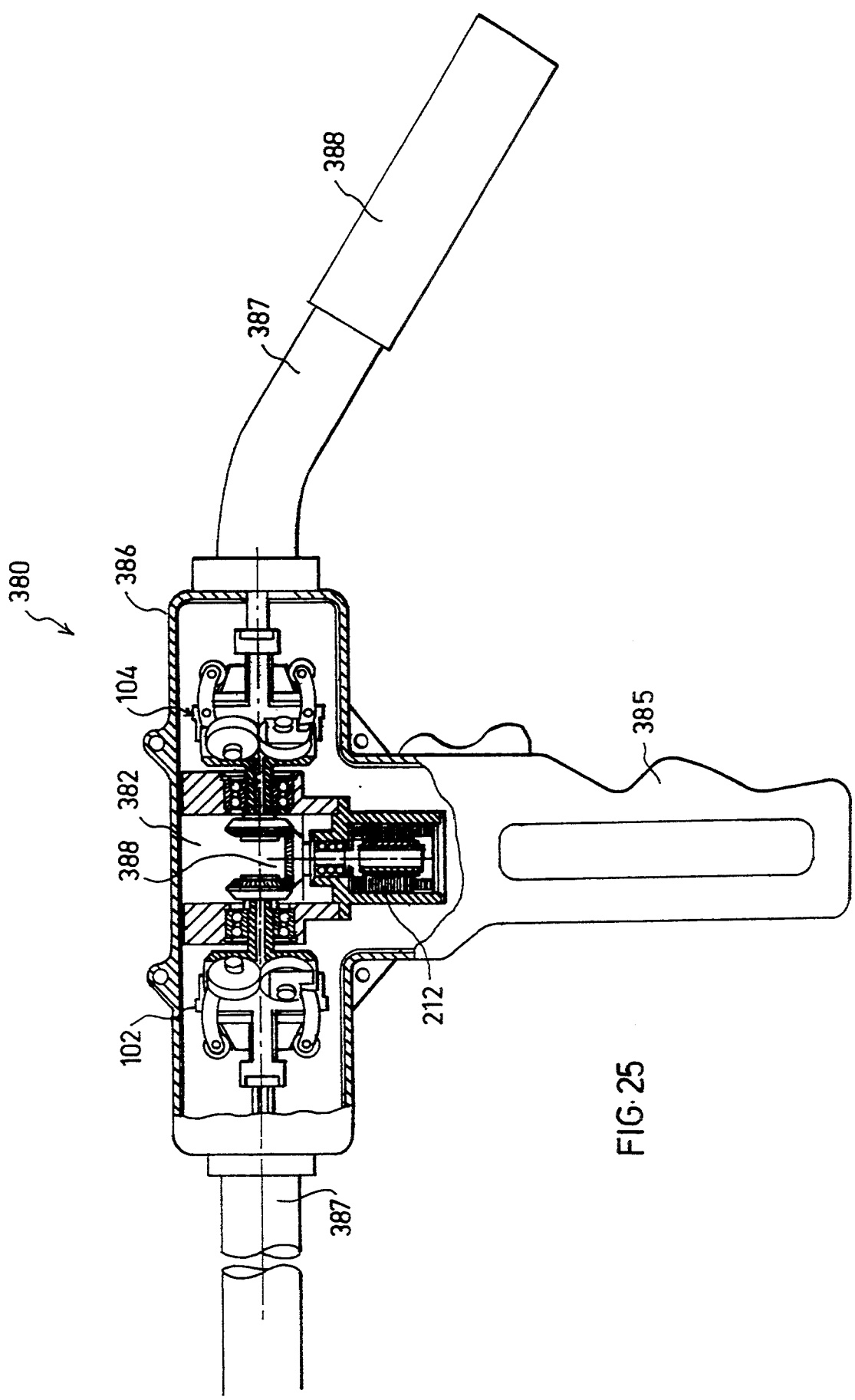
FIG. 25 is a side-view illustration of a pistol type welding gun employing a double-action feeder constructed substantially as illustrated in FIG. 21.

Referring now to FIG. 25, there is shown a pistol type of welding gun, referenced generally 380, employing a double-action feeder 382, constructed and operative in accordance with an embodiment of the present invention. In the present example, feeder 382 is constructed substantially as illustrated in FIG. 21 and is therefore not described again herein. Feeder components are denoted herein by the same reference numerals as appear in FIG. 21. It will be appreciated, however, that feeder 382 may be of substantially any of the feeders described hereinabove.

Welding gun 380 is associated with a feed conduit 384 and comprises a handle 385, a housing 386, and a welding head 388. Housing 386 is adapted to contain a double-action feeder 382 so as to feed an electrode wire 387 through feed conduit 384 and along a feed axis 388 about which feeder 382 revolves when in operation. A length of conduit 384 may lie in a typical range of 3.0–4.5 m and may be augmented to 16–28 meters, depending on the type of feeder used, the diameter and stiffness of the wire, and the speed at which it is sought to feed the wire.

It will be appreciated by persons skilled in the art that the scope of the present invention is not limited to what has been specifically shown and described hereinabove by way of example. Rather, the scope of the invention is limited solely by the claims, which follow:

I claim:

1. A universal planetary feeder head for feeding a wire comprising:

a generally elongate hollow body defining a wire feed axis and adapted for high speed rotation thereabout;

a pair of planetary rollers associated with said body so as to be rotatable together with said body about said feed axis and mounted about said feed axis in mutually skewed respective orientations, wherein said planetary rollers respectively define circumferential peripheral feed surfaces spaced from each other about said feed axis and configured for simultaneous engagement with a wire along preselected lines of contact therewith, and wherein each said feed surface is intersected at right angles by a plane that is offset from said feed axis by an offset angle;

means for pivoting each said roller about, an axis normal to said feed axis so as to adjust the offset angle between said roller and said feed axis, thereby to select a roller feed surface profile parallel to said feed axis which corresponds to the external configuration of a wire selected from a range of wires having different diameter sizes, thus providing a line of maximum contact between said roller feed surface and the selected wire; and means for simultaneously urging said pair of rollers radially towards said feed axis so as to apply a normal force to the wire along said lines of contact between said roller feed surfaces and the wire, and wherein, when said body and rollers are rotated about said feed axis, said rollers are operative to apply to the wire a generally tangential force along said lines of contact, thereby to feed the wire along said feed axis.

2. A feeder head according to claim 1, and wherein said means for urging comprises means for simultaneously applying a radial force to said rollers.

3. A feeder head according to claim 2, and wherein said means for simultaneously applying a radial force to said rollers comprises:

a resilient compression member having a first end mounted onto said body, and also having a second end;

a pair of levers associated with respective ones of said pair of planetary rollers, wherein each said lever has a first end associated with an associated roller and also has a second, free end, and wherein each lever is hingedly mounted on a predetermined portion of said body; and force transmission means, located between said second end of said compression member and said second end of each said lever, operative to transmit a force from said compression member to said associated lever, and wherein said lever is operative, in response to application of said force thereto by said force transmission means, to apply a corresponding radial force to said roller associated therewith.

4. A feeder head according to claim 3, and wherein said force transmission means comprises:

a force transmission member located between said second ends of said levers and said compression member and in touching engagement with said lever second ends; and means for adjusting the position of said force transmission member relative to said second end of said compression member, thereby also adjusting the force transmitted therefrom to said levers and said rollers.

5. A feeder head according to claim 1 and also comprising:

a pair of generally hollow piston members mounted in said body along a radial axis perpendicular to said feed axis and having open ends adjacent thereto, wherein each said piston member is configured to house one of said rollers, and wherein each said piston member has a side wall which extends in a generally radial direction and in which is formed at least one pair of diametrically opposed openings, and wherein each said roller is mounted onto an associated piston via an axle extending at right angles to said radial axis and so as to protrude through said at least one pair of openings.

6. A feeder head according to claim 5, and wherein said piston members are mounted in said body so as to position said rollers in mutually skewed respective orientations.

7. A feeder head according to claim 6, and wherein said body has formed in association therewith and in registration with said first and second pairs of openings in said piston members, two mutually skewed pairs of diametrically opposed grooves extending at least partially along the length of said piston members, and wherein each said pair of grooves formed in association with said body is configured to accommodate the ends of said axle of one of said rollers.

8. A feeder head according to claim 6, and wherein said body defines generally cylindrical, radial openings and said feeder head also comprises:
generally hollow carrying means rotatably mounted in said radial openings in said body and adapted to house said piston members therein, and also having formed therein, in registration with said first and second pairs of openings in said piston members, two mutually skewed pairs of diametrically opposed grooves extending at least partially along the length of said carrying means, and wherein each said pair of grooves formed in association with said body is configured to accommodate the ends of said axle of one of said rollers,
and wherein said means for pivoting each said roller comprises means for rotating said carrying means, thereby also to rotate said piston members and said planetary rollers.

9. A feeder head according to claim 1 and wherein each said roller has a hyperboloidal surface profile selected to correspond to a median diameter of a range of wires with predetermined respective diameters.

10. A feeder head according to claim 1 and wherein said means for pivoting each said roller about an axis normal to said feed axis so as to adjust the offset angle between said roller and said feed axis comprises means for pivoting each said roller through an adjustment angle $\delta$ in accordance with the formula $$\delta_{1,2} = \arccos\left[\frac{d_{1,2}\sin\beta}{B}\right] - \beta - \alpha_m$$

wherein:
$d_{1,2}$ is the diameter of a selected wire,
B is the width of said roller parallel to said feed axis, $$\beta = \arcsin\frac{B}{\left[\left[\frac{B + D_m\sin\alpha_m}{\cos\alpha_m}\right]^2 + D_m^2\right]^{\frac{1}{2}}}$$

$D_m$ is a predetermined median wire diameter for said roller profile, and
$\alpha_m$ is the angle of between a reference axis normal to said feed axis and an edge of said roller perpendicular to said axle.

11. A method of feeding a wire comprising the following steps:
employing a pair of planetary rollers spaced about and adapted to be rotatable about a wire feed axis;
orienting the rollers so as to provide a line of maximum contact between each roller and a wire of a selected diameter size;
simultaneously urging the pair of rollers radially towards the feed axis so as to apply a normal force to the wire along the lines of contact between the rollers and the wire; and
rotating the rollers about the feed axis so as to apply to the wire a generally tangential force along the lines of contact, thereby to feed the wire along the feed axis.

12. A method according to claim 11, and wherein said step of orienting comprises the step of pivoting each roller about an axis normal to the feed axis so as to adjust the offset angle between the roller and the feed axis, thereby to select a peripheral roller surface profile which is parallel to the feed axis and which corresponds to the external configuration of a wire selected from a range of wires having different diameter sizes.

13. A method according to claim 11 and wherein said step of for urging comprises the step of simultaneously applying a radial force to the rollers.

14. A method according to claim 13, and wherein the step of simultaneously applying a radial force to the rollers includes the step of adjusting the force applied to the rollers.

15. A method according to claim 11 and wherein said step of orienting the rollers comprises the step of pivoting each roller about an axis normal to the feed axis so as to adjust the offset angle between the roller and the feed axis by an adjustment angle $\delta$ in accordance with the formula $$\delta_{1,2} = \arccos\left[\frac{d^{1,2}\sin\beta}{B}\right] - \beta - \alpha^m$$

wherein:
$d^{1,2}$ is the diameter of a selected wire and
B is the width of said roller parallel to said feed axis.

16. A planetary feeder head for feeding a wire comprising:
a generally elongate hollow body defining a wire feed axis and adapted for high speed rotation thereabout;
a pair of generally hollow piston members mounted in said body along a radial axis perpendicular to said feed axis and having open ends adjacent thereto, and wherein each said piston member has a side wall which extends in a generally radial direction and in which is formed at least one pair of diametrically opposed openings, said piston members being rotatable together with said body about said feed axis;
a pair of planetary rollers each housed within a respective piston member and mounted via an axle extending at right angles to said radial axis and so as to protrude through said at least one pair of openings, wherein said rollers are mounted about said feed axis in mutually skewed respective orientations, and wherein said planetary rollers define respective circumferential peripheral feed surfaces which are spaced from each other about said feed axis and which are configured for simultaneous engagement with a wire along respective lines of contact therewith; and
means for simultaneously urging said piston members and, therefore, said rollers radially towards said feed axis so as to apply a normal force to the wire along said lines of contact between said roller feed surfaces and the wire,
and wherein, when said body, said pistons and said rollers are rotated about said feed axis, said rollers are operative to apply to the wire a generally tangential force along said lines of contact, thereby to feed the wire along said feed axis.

17. A feeder head according to claim 16, and wherein said at least one pair of openings in each piston member comprises a first pair of diametrically opposed openings for accommodating said axle ends and a second pair of diametrically opposed openings to accommodate peripheral portions of said rollers, and wherein
said body has formed therein recesses which have peripheral surfaces in which are defined, in registration with said first and second pairs of openings in said piston members, two mutually skewed pairs of diametrically opposed, generally radially extending grooves, of which a first pair is configured to accommodate said axle ends and a second pair of which is configured to accommodate peripheral portions of said rollers.

18. A feeder head according to claim 16 and wherein each said roller has a hyperboloidal surface profile.

19. A feeder head according to claim 16 and wherein said means for urging comprises means for simultaneously applying a radial force, via said piston members, to said rollers.

20. A feeder head according to claim 19, and wherein said means for simultaneously applying a radial force to said rollers comprises:
   a resilient compression member having a first end mounted onto said body, and also having a second end;
   a pair of levers associated with respective ones of said pair of planetary rollers, wherein each said lever has a first end associated with an associated roller and also has a second, free end, and wherein each lever is hingedly mounted on a predetermined portion of said body; and
   force transmission means, located between said second end of said compression member and said second end of each said lever, operative to transmit a force from said compression member to said associated lever, and wherein said lever is operative, in response to application of said force thereto by said force transmission means, to apply a corresponding radial force to said roller associated therewith.

21. A feeder head according to claim 20, and wherein said force transmission means comprises:
   a force transmission member located between said second ends of said levers and said compression member and in touching engagement with said lever second ends; and
   means for adjusting the position of said force transmission member relative to said second end of said compression member, thereby also .adjusting the force transmitted therefrom to said levers and said rollers.

22. Apparatus for feeding a wire along a feed axis comprising:
   a base;
   first and second planetary feeder means mounted onto said base for rotation about a feed axis for feeding a wire therealong; and
   rotation means for rotating said first planetary feeder means in a first predetermined rotation sense about said feed axis so as to cause feeding of the wire along said feed axis in a predetermined feed direction, said rotation means also including means for rotating said second planetary feeder means in a second predetermined rotational sense about said feed axis, opposite to said first predetermined rotational sense, so as to cause feeding of the wire along said feed axis in said predetermined feed direction, and wherein said first and second planetary feeder means include:
   a first pair of mutually skewed rollers disposed about said feed axis so as to engage the wire extending therealong and adapted, when stationary, to apply thereto a force normal to said axis, wherein said first pair of rollers is further adapted, upon rotation of said first planetary feeder means by said rotation means, to apply to the wire a force which includes an axial force component applied about said feed axis in said predetermined feed direction; and
   a second pair of mutually skewed rollers disposed about said feed axis so as to engage the wire extending therealong and adapted to apply thereto a force normal to said axis, wherein said second pair of rollers is further adapted, upon rotation of said second planetary feeder means by said rotation means, to apply to the wire a force which includes an axial force component applied generally along said feed axis, and a torsional force component applied about said feed axis in a second direction opposite to said first direction.

23. Apparatus according to claim 22, and wherein said rotation means is adapted to rotate said respective first and second planetary feeder means in opposite directions about said feed axis at respective speeds, such that the respective torsional force components applied to the wire in said predetermined feed direction and in a direction which is opposite said predetermined feed direction by said respective first and second pairs of rollers are of approximately equal magnitude.

24. Apparatus according to claim 23, and wherein said rotation means comprises:
   a motor; and
   drive means associated with said motor, and arranged to transmit a rotational output from a drive shaft of said motor to said first and second planetary feeder means.

25. Apparatus according to claim 24, and wherein said first and second planetary feeder means are oriented such that said first and second pairs of rollers face generally towards each other.

26. Apparatus according to claim 24, and wherein said first and second planetary feeder means are oriented such that said first and second pairs of rollers face generally away from each other.

27. Welding apparatus comprising:
   a housing;
   a wire feed conduit associated with said housing and also having a second end;
   a welding head; and
   feed apparatus, mounted in said housing, for feeding an electrode wire along said conduit toward said welding head, and also defining a wire feed axis,
   wherein said feed apparatus comprises:
   a base;
   first and second planetary feeder means mounted onto said base for rotation about a feed axis for feeding a wire therealong; and
   rotation means for rotating said first planetary feeder means is a first predetermined rotational sense about said feed axis so as to cause feeding of the wire along said feed axis in a predetermined feed direction, said rotation means also including means for rotation said second planetary feeder means m a second predetermined rotational sense about said feed axis, opposite to said first predetermined rotational sense, so as to cause feeding of the wire along said feed axis in said predetermined feed direction , and wherein said first and second planetary feeder means include:
   a first pair of mutually skewed rollers disposed about said feed axis so as to engage the wire extending therealong and adapted, when stationary, to apply thereto a force normal to said axis, wherein said first pair of rollers is further adapted, upon rotation of said first planetary feeder means by said rotation means, to apply to the wire a force which includes an axial force component applied generally along said feed axis, and a torsional force component applied about said feed axis in said predetermined feed direction; and a second pair of mutually skewed rollers disposed about said feed axis so as to engage the wire extending therealong and adapted to apply thereto a force normal to said axis, wherein said second pair of rollers is further adapted, upon rotation of said second planetary feeder means by said rotation means, to apply to the wire a force which includes an axial force component applied generally along said feed axis, and a torsional force component applied about said feed axis in a second direction opposite to said first direction.

28. Welding apparatus according to claim 27, and wherein said rotation means is adapted to rotate said respective first and second planetary feeder means in opposite directions about said feed axis at respective speeds, such that the respective torsional force components applied to the wire in said predetermined feed direction and in a direction which is opposite said predetermined feed direction by said respective first and second pairs of rollers are approximately equal magnitude.

29. Welding apparatus according to claim 28, and wherein said rotation means comprises:
a motor; and
drive means associated with said motor, and arranged to transmit a rotational output from a drive shaft of said motor to said first and second planetary feeder means.

30. Welding apparatus according to claim 29, and wherein said first and second planetary feeder means are oriented such that said first and second pairs of rollers face generally towards each other.

31. Welding apparatus according to claim 29, and wherein said first and second planetary feeder means are oriented such that said first and second pairs of rollers face generally away from each other.

32. A method of feeding a wire along a feed axis comprising:
employing at least one pair of planetary feeders adapted to be rotatable about a wire feed axis;
rotating a first one of the pair of planetary feeders in a first predetermined rotational sense about the feed axis in a predetermined feed direction, and wherein said step of rotating a first one of the pair of planetary feeders comprises the sub-steps of:
arranging a first pair of mutually skewed rollers about the feed axis so as to engage the wire extending therealong;and rotating the first pair of rollers about the feed axis so as to apply to the wire a force which includes an axial force component applied generally along the feed axis, and a torsional force component applied about the feed axis in a first direction; and
said step of rotating the other of the pair of planetary feeders comprises the sub-steps of:
arranging a second pair of mutually skewed rollers about the feed axis so as to engage the wire extending therealong; and
rotating the second pair of rollers about the feed axis so as to apply to the wire a force which includes an axial force component applied generally along the feed axis, and a torsional force component applied about the feed axis in a second direction opposite to the first direction.

33. A method according to claim 32, and wherein said step of rotating the first pair of rollers comprises the step of rotating the first pair of rollers about the feed axis in the first direction at a first speed, and
said step of rotating the second pair of rollers comprises the step of rotating the second pair of rollers about the feed axis in the second direction at a second speed similar to the first speed, such that the respective torsional force components applied to the wire in first and second directions by the respective first and second pairs of rollers are of approximately equal magnitude.

* * * * *